US012801889B2

(12) United States Patent
Bennett et al.

(10) Patent No.: US 12,801,889 B2
(45) Date of Patent: Nov. 17, 2026

(54) MULTI-NODE INFLUENCE BASED ARTIFICIAL INTELLIGENCE TOPOLOGY SELECTION

(71) Applicant: Fantagic Holdings LLC, Naples, FL (US)

(72) Inventors: James Duane Bennett, Naples, FL (US); Bindu Rama Rao, Naples, FL (US)

(73) Assignee: Fantagic Holdings LLC, Naples, FL (US)

( * ) Notice: Subject to any disclaimer, the term of this patent is extended or adjusted under 35 U.S.C. 154(b) by 380 days.

(21) Appl. No.: 18/767,206

(22) Filed: Jul. 9, 2024

(65) Prior Publication Data

US 2025/0021796 A1 Jan. 16, 2025

Related U.S. Application Data

(60) Provisional application No. 63/525,817, filed on Jul. 10, 2023.

(51) Int. Cl.
*G06N 3/004* (2023.01)
*G06N 3/045* (2023.01)
(Continued)

(52) U.S. Cl.
CPC ............. *G06N 3/004* (2013.01); *G06N 3/045* (2023.01); *G06N 3/0475* (2023.01); *G06N 3/063* (2013.01);
(Continued)

(58) Field of Classification Search
CPC ...... G06N 3/004; G06N 3/045; G06N 3/0475; G06N 3/063; G06N 5/02; G06N 5/043; G06N 3/08
See application file for complete search history.

(56) References Cited

U.S. PATENT DOCUMENTS 7,873,584 B2 * 1/2011 Asher ...................... G06N 3/02 706/20
10,762,423 B2 * 9/2020 Henry .................... G06N 3/092
(Continued)

*Primary Examiner* — Jorge A Casanova
(74) *Attorney, Agent, or Firm* — McAndrews, Held & Malloy, Ltd.

(57) ABSTRACT

A multi-node artificial intelligence topology adapts to service many different overall purposes. Support processing nodes, discriminative AI elements, generative AI elements along with input, output and communication circuitry along with other outside interactions provide the nodal basis for the overall topology. Therewithin, outputs of several nodes drive a single node which uses influence balancing to optimize its own output. Influence is delivered in feed forward and feed back manner. Segmented processing is provided where sections of an overall output goal is processed through the topology in segments, e.g., chapter by chapter of a novel, episode by episode, a full topology processing using internal cross node influence followed by a second full topology processing using both internal cross node and cross segment influence. Pseudo random templating providing constraints used to progress through segments to control an output flow. AI elements can be fully software, use acceleration circuitry, and employ neural network circuitry such as analog and digital versions thereof. Topologies also adapt between local and remote processing locations on a node by node basis, where, for example, some AI elements or nodes operate in the cloud, while other AI elements operate on a particular user's device or other user devices located remotely. Topologies adapt in real time to move nodes to away from a user's device to a cloud counterpart and vice versa as circumstances change.

20 Claims, 9 Drawing Sheets

(51) Int. Cl.
*G06N 3/0475* (2023.01)
*G06N 3/063* (2023.01)
*G06N 3/08* (2023.01)
*G06N 5/02* (2023.01)
*G06N 5/043* (2023.01)

(52) U.S. Cl.
CPC ................. *G06N 3/08* (2013.01); *G06N 5/02* (2013.01); *G06N 5/043* (2013.01)

(56) References Cited

U.S. PATENT DOCUMENTS

| | | | | |
|---|---|---|---|---|
| 11,072,067 | B2 * | 7/2021 | Bergstra | B25J 9/161 |
| 12,306,738 | B1 * | 5/2025 | Lu | G06N 20/00 |
| 12,665,866 | B2 * | 6/2026 | Maddi | H04L 51/02 |
| 2012/0036523 | A1 * | 2/2012 | Weintraub | H04N 7/173<br>725/9 |
| 2016/0328644 | A1 * | 11/2016 | Lin | G06N 3/045 |
| 2019/0197411 | A1 * | 6/2019 | Di | G06N 5/02 |
| 2019/0370647 | A1 * | 12/2019 | Doshi | G06F 11/3452 |
| 2020/0327409 | A1 * | 10/2020 | Kim | G06N 3/0895 |
| 2021/0174163 | A1 * | 6/2021 | Verma | G06V 10/94 |
| 2021/0182664 | A1 * | 6/2021 | Kim | G06N 3/04 |
| 2021/0248514 | A1 * | 8/2021 | Cella | G06N 20/00 |
| 2022/0269943 | A1 * | 8/2022 | Szatmary | G06N 5/04 |
| 2023/0055204 | A1 * | 2/2023 | Ungureanu | G06N 3/04 |
| 2025/0021798 | A1 * | 1/2025 | Bennett | G06N 3/004 |
| 2025/0117625 | A1 * | 4/2025 | Song | G06N 3/045 |
| 2025/0335779 | A1 * | 10/2025 | Paul | G06N 3/094 |
| 2026/0093646 | A1 * | 4/2026 | Cooper | G06F 13/20 |

* cited by examiner

Memory Storage of Exemplary Topology Specifications 701

| | | | |
|---|---|---|---|
| 731 | Storybook (SB) | [Story 611] ++ { Influence_C > G3^C5 } | text to text & text to image |
| 733 | Directed SB | [Story 611] ++ { Influence_D > G3^C5 } | text to text & text to image |
| 735 | Image Music (IM) | Random_imageA ++ Music_OutA | text to image & image to music |
| 737 | Directed IM | Random_imageB ++ Music_OutB | text to image & image to music |

| | | | |
|---|---|---|---|
| 711 | pre-influence | ( ( ( story_text_output_seg > S14 ) > S10 ) > S16 ) > S3 | |
| 713 | Influence_C | ( ( ( S5, pre-influence ) > S7 ) > S16 ) > S17 | |
| 715 | Influence_D | ( ( ( S5, pre-influence, [Input_A 625] ) > S7 ) > S16 ) > S17 | |
| 717 | Random_imageA | S5 > G4^C6 | <<note : text to image>> |
| 719 | Random_imageB | ( ( S5, [Input_A 625] ) > S7 ) > G4^C6 | <<note : text to image>> |
| 721 | Music_OutA | random_imageA > G6^C7 | <<note : image to music>> |
| 723 | Music_OutB | random_imageB > G6^C7 | <<note : image to music>> |

FIG. 7

Memory Storage of Exemplary Topology Specifications 801

| | | 803 | 805 | 807 |
|---|---|---|---|
| 831 | Singalong (SA) | LyricsA ++ MusicA | text to text & text to music |
| 833 | Directed SA | LyricsB ++ MusicB | text to text & text to image |
| 835 | Selfie Talker (ST) | Subtitle_A ++ Video_A | text & image to video |
| 837 | Directed ST | Subtitle_B ++ Video_B | text & image to video |

| | | |
|---|---|---|
| 811 | LyricsA | [Influence_A 621] > G1^C3 |
| 813 | LyricsB | ( ( [Influence_B 623], [Input_A 625] ) > S7 ) > G1^C3 |
| 815 | NotesA (or NotesB) | LyricsA (or LyricsB) > G2^C5 |
| 817 | MusicA (or MusicB) | NotesA (or LyricsB) > G8^C1 |
| 819 | Subtitle_A | ( ( S5, [Influence_A 621] ) > S7 ) > G1^C4 <<text to text>> |
| 821 | Subtitle_B | ( ( S5, [Input_A 625], [Influence_A 621] ) > S7 ) > G1^C4 |
| 823 | Video_A | (Subtitle_A, user_selfie) > G9^C2 <<text & image to video>> |
| 825 | Video_B | (Subtitle_B, user_selfie) > G9^C2 <<text & image to video>> |

FIG. 8

Set of further exemplary topology specifications 901

| | 903 | 905 | 907 |
|---|---|---|---|
| 911 | Video Act (VA) | Video_OutA | text to text & text to video |
| 913 | Directed VA | Video_OutB | text to text & text to video |

| | | | |
|---|---|---|---|
| 915 | screenplay_A | { ( S5, [Influence_A 621]) > S7 } > G1^C4 | text & text |
| 917 | screenplay_B | { ( S5, [Influence_A 621], [Input_A 625]) > S7 } > G1^C4 | text & text |
| 919 | Video_OutA | screenplay_A > G6^C2 | text to video |
| 921 | Video_OutB | screenplay_A > G6^C2 | text to video |

FIG. 9

MULTI-NODE INFLUENCE BASED ARTIFICIAL INTELLIGENCE TOPOLOGY SELECTION

The present application makes reference to, claims priority to, and claims benefit from provisional patent application 63/525,817, filed on Jul. 10, 2023, and titled "Multi-Node Influence Based Artificial Intelligence Topology." The above-referenced application is hereby incorporated herein by reference in its entirety.

BACKGROUND

1. Technical Field

The present invention relates generally to generative and discriminative artificial intelligence; and, more particularly, to adaptive remote and local multi-node artificial intelligence topologies serving a common functionality.

2. Related Art

Basic training and deployment of single nodes of generative and discriminative Artificial Intelligence (hereinafter "AI") is commonplace. Various AI models currently exist while other models are under development to gain high quality AI output and discrimination. In addition to the model's themselves, the amount of training data utilized continues to grow with quality of training data also becoming more important. Most AI models operate in the cloud due to: a) heightened processing, speed, and storage demands; b) massive numbers of user requests to service; and c) design goals of responding to user service requests that have little subject matter bounds. Because of these factors, users will inevitably end up being assessed costs associated with such cloud based AI services, e.g., in advertising or periodic charges to use such AI models.

Moreover, if the cloud AI service receives too many simultaneous requests beyond its capability or when a denial of service attack takes place, servicing user requests becomes unpredictable. Many users will find unacceptable delays or are guided to try again later. And when a user's device is offline, such cloud based AI services become fully unavailable.

Turning to the cloud based AI models themselves, they are designed and trained to operate as independent generative AI offerings, for example, taking in user text queries and output kind of request text output. These offerings are massively over-engineered in scope and under-engineered in specific quality for a servicing one particular user's particular current needs.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 7 is a diagram illustrating a number of further exemplary topology specifications for carrying out some other functions identified in the topologies set forth in FIG. 5;

FIG. 8 is a diagram that illustrates a further number of possible topology specifications for carrying out the yet other functionality identified in several of the topologies identified in FIG. 5; and FIG. 9 is a diagram illustrating a set of exemplary topology specifications for carrying out the remaining functionality identified in a corresponding remaining set of the topologies set forth in FIG. 5.

DETAILED DESCRIPTION OF THE DRAWINGS

Figure 1:
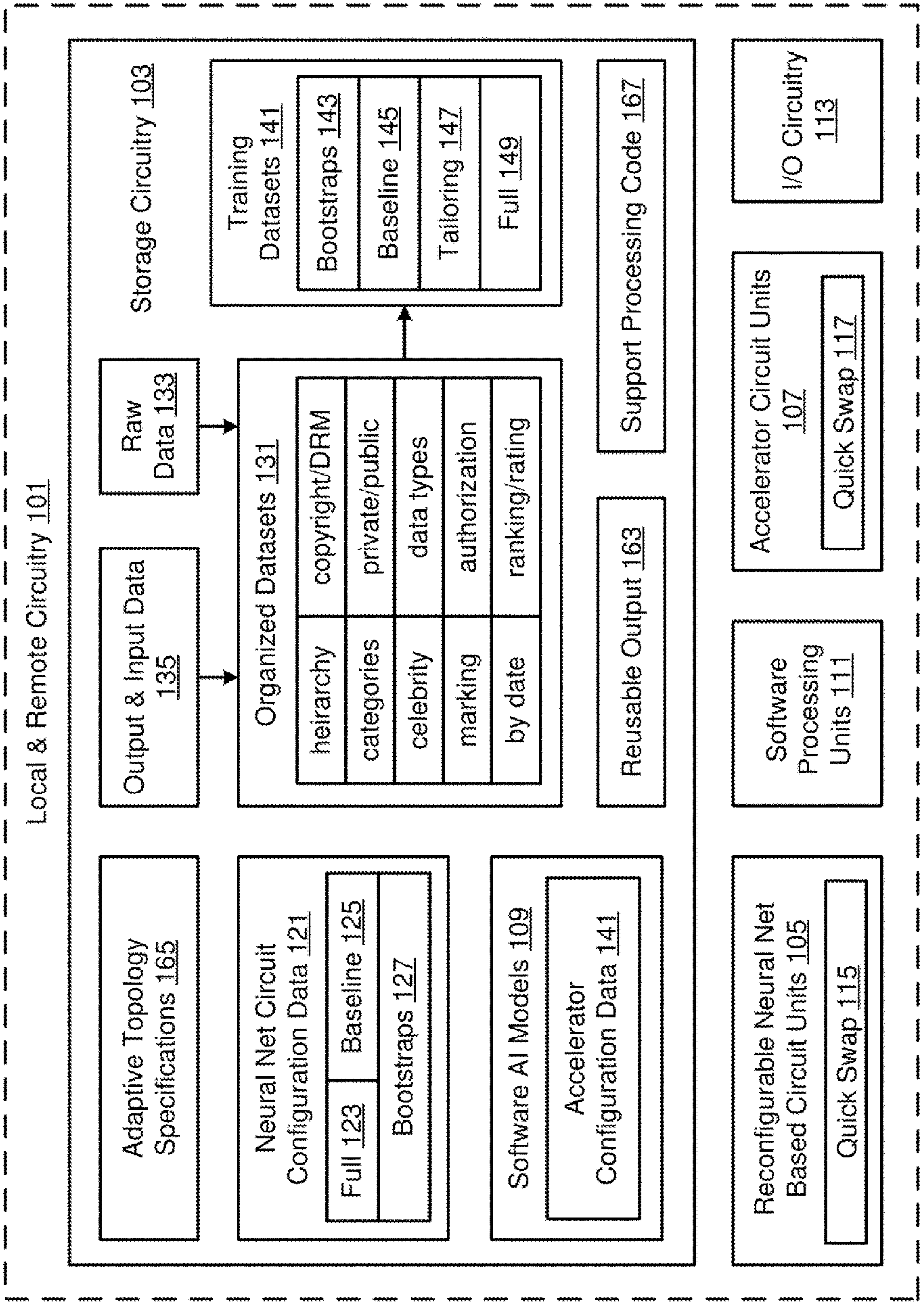
FIG. 1 is a schematic diagram illustrating exemplary circuitry supporting adaptable multi-node artificial intelligence operations in cooperative local and remote configurations.

FIG. 1 is a schematic diagram illustrating exemplary circuitry supporting adaptable multi-node artificial intelligence operations in cooperative local and remote configurations. Within local and remote circuitry 101, storage circuitry 103 contains different types of data that service a myriad of artificial intelligence (AI) based functions. Such functions employ several approaches to carrying out the underlying AI. For example, both reconfigurable neural network based circuit units 105 and software AI models 109 can be used. Some AI based functions only utilize one or more of the software AI models 109. Only one or more of the reconfigurable neural net based circuit units 105 may be used for other AI based functions. Yet other AI based functions may employ one or more of each of the software AI models 109 and the reconfigurable neural net based circuit units 105.

Each of the reconfigurable neural net based circuit units 105 comprise dedicated silicon designs that correspond to neural network layouts. For example, some are various implementations of analog neural network arrays and others for example are pulse code modulated approaches to modeling of neural network arrays. Other of the reconfigurable neural net based circuit units 105 comprise a combination of analog and digital or even fully digital circuit representations of a neural network array.

General purpose processing counterparts fully defined in software with or without acceleration support are also provided. Specifically, the software AI models 109 define their own neural network operations programmatically which are executed on software processing units 111. The software processing units 111 are typical general purpose digital processing that service any type of software program or application. In addition, some of the software AI models 109 define interactions with specific underlying circuitry that can accelerate AI computations and might also be designed to conserve overall energy usage. In particular, accelerator configuration data 141 is used to tailor the accelerator circuit units 107 for offloading the software processing units 111 for more complex or demanding computations. In addition, a quick swap circuit 117, for example, a local storage or registers associated with the accelerator circuit units 107 allows for multiple different models of the software AI models 109 to swap in their own accelerator configuration data 141 back and forth as needed in a time shared or always readied state.

Each of the reconfigurable neural net based circuit units 105 post training will have associated sets of characteristics (e.g., neural net node weightings and vector tables) that together define an overall configuration that is copied into the neural net circuit configuration data 121 and shared with counterparts both locally, in the cloud, and at other remote locations such as within multiple different users' devices. In particular, for example, a first unit of the reconfigurable neural net based circuit units 105 comprises an analog representation of a full neural network array. When a first training for a first purpose ends, each of the neural network nodes within the full neural network analog array will have an associated analog levels. Those levels can be extracted as first configuration data via analog to digital conversion and combined with all other extracted digital values for that first unit of the neural net based circuit units 105.

First configuration data can later be reloaded or shared with other reconfigurable neural net based circuit units 105 to establish an operational state that services the first purpose without having to retrain. Second and so on other configuration data can be similarly captured after training for other operational purposes. Many of these trained-in configuration datasets stored with the neural net circuit configuration data 121 can be applied to even a single circuit unit of the reconfigurable neural net based circuit units 105 for utilization in a time shared manner. As mentioned above, quick swapping between these configurations to quickly ready a single circuit unit of the reconfigurable neural net based circuit units 105 can be improved via the quick swap circuitry 115. Otherwise, loading of a particular operational configuration into the reconfigurable neural net based circuit units 105 can be made directly from the neural net circuit configuration data 121.

In this way, any of the reconfigurable neural net based circuit units 105 can be quickly reconfigured on the fly to support multiple different AI purposes. In addition, some of the reconfigurable neural net based circuit units 105 may contain multiple neural networks in an overall AI element configuration for a particular operational purpose, and may or may not include supporting training circuit elements depending on the needs and requirements. In such layouts, the grand total of all neural network nodes and interconnect circuitry constitutes a single circuit unit (hereinafter, an "AI element") and the configuration data includes all trained in operational values associated with all underlying neural network nodes in all corresponding arrays.

Trainings can occur remotely or locally and all of the neural net circuit configuration data 121 can then be shared in other remote and other local circuit instances of the reconfigurable neural net based circuit units 105 without having to retrain. In some of these neural network based circuit units 105, training related circuitry may be present for first or tailored trainings, but in others of the reconfigurable neural net based circuit units 105 training related circuitry may be absent and rely merely on other of the reconfigurable neural net based circuit units 105 to conduct training and share their neural net circuit configuration data 121 for configuration setups to reach an operational state.

The neural net circuit configuration data 121 is sorted into full configurations 123, baseline configurations 125 and bootstrap configurations 127. With a full configuration, no further training is necessary for a particular circuit unit of the reconfigurable neural net based circuit units 105 to reach satisfactory AI performance for a given purpose. The bootstrap configurations 127 and the baseline configurations 125 are both partial configurations corresponding to partially trained ones of the reconfigurable neural net based circuit units 105. For example, a partial training one of the reconfigurable neural net based circuit units 105 with a capability to convert user input text to an image might involve a first set of remotely located training data (e.g., images and text) from organized datasets 131 found in the storage circuitry 103.

With that first set of training data applied to one of the reconfigurable neural net based circuit units 105, a first training configuration dataset can be extracted and stored as one of the baseline configurations 125 or one of the bootstraps configurations 127 depending on how extensive and how much influence the remotely located training data happens to be in comparison to for example locally stored training data to be used as a second set of training data. If the second set is to be dominant, the first set may be categorized as bootstrapping data. If the first set is to be dominant, it may be categorized as baseline data. Conceptually, the bootstrap configuration 127 acts to prepare the reconfigurable neural net based circuit units 105 for tailoring 147 wherein the bootstrap training does not overly dominate output, while the tailoring 147 influence on output is maximized in comparison.

Thus, by loading baseline data from the baseline configurations 125 into one of the reconfigurable neural net based circuit units 105, it will be immediately ready to continue training with the local data found within the organized datasets 131. Once this training is complete, this circuit unit of the reconfigurable neural net based circuit units 105 will be ready for operation, and, if desired, the then current configuration data from the neural network(s) of this circuit unit of the reconfigurable neural net based circuit units 105 can be captured and stored as one of the full configurations 123.

An example of this is where public data is used remotely in a cloud configuration to train to reach a first bootstrap configuration that is stored in the bootstrap configurations 127. This first bootstrap configuration can then be loaded in a local AI circuit unit of the reconfigurable neural net based circuit units 105 such that it will aid in rapid training using a user's private data building off of the first bootstrap training state. This approach will provide anonymity and personalization that a user may desire for a particular AI operation handled locally on a smartphone or personal computer, for example.

Another example involves massive sized data sets available remotely within the organized datasets 131 where training efforts and operational performance does not lend itself well to local training and operational performance by a local AI unit of the reconfigurable neural net based circuit units 105. In such circumstances, the training and full operational status of a first AI unit of the reconfigurable neural net based circuit units 105 take place in the cloud on remote circuitry portions of the local and remote circuitry 101, and are available to online users of for example a smartphone with local circuitry portions also of the local and remote circuitry 101.

As the online users interact with the first operational AI unit of the reconfigurable neural net based circuit units 105, they provide user input and receive for example generative AI output which the users can rate as to the quality or rating of the output generated from their input. In addition, the frequency of certain repeated questions from around the world can be tallied and such tallies can be compared and ordered as a ranking. These ranks and ratings are also stored along with the user input and generated output pairs with the organized datasets 131.

Next, a training of a second AI unit of the reconfigurable neural net based circuit units 105 takes place. This second AI unit can be local or remote but using these input and generated output pairs. All such pairs can be used or just those that meet a desired higher-level rank and rating levels to control the training set size. Once trained, the resulting configuration data of the second AI unit is stored with the full configurations 123 and can be used to configure at any time a local AI unit (within the cellphone) of the reconfigurable neural net based circuit units 105 such that further questions that are likely to arise from the present cell phone user can be answered. This second, local AI unit training set can be smaller and training time much shorter, requiring lesser processing and battery power requirements than that of the first AI unit while being able to adequately answer most common questions.

Yet when a user's question (user input) arises that cannot be adequately answered by the second, local AI unit, such question is passed on to the first AI unit in the cloud for servicing from its original, full training data set capability. This local to remote interaction supports remote cloud offloading and local rapid and offline operations not requiring third party fees and can indicate further training needs that are personal to each particular user. For example, if a user of a cell phone asks numerous questions in a biological sciences category that aren't common and not trained in to the second local generative AI, a packet of training data can be constructed of that user's input queries and generated output from the remote first AI unit interactions where the local AI unit interactions failed. By running another training cycle using this input and remote output pair data and even including the base data portions relating to biological sciences that was used in training the first remote AI unit, future such user queries might be served locally and without having to resort to a remote interaction with the first remote AI unit. As used herein, this balancing of shared AI operational burdens can also span between multiple remote AI units of the reconfigurable neural net based circuit units 105 without local AI unit participation, between multiple local AI units of the reconfigurable neural net based circuit units 105 without remote AI unit participation, between two personal local AI units embedded within two different user devices that are relatively collocated or in possession of another user at a different location of such different user, and even between two fully local AI units within a single user device (e.g., a cell phone or other computing device). As used herein, this cooperative interaction is referred to as cooperative independent multiple AI infrastructure.

In such circumstances, load balancing, energy usage, processing resources, and associated other costs can be adjusted on the fly as at least somewhat parallel options become available. To assist in decision making between two or more of such parallel AI resources (i.e., AI units that perform much the same task in input and output flows), a user can make the decision along with a request as well along with the delivery of a user query as user input. A user may also make the decision by evaluating an output from a first generative AI and then by requesting an alternative AI output in hopes of receiving a higher quality output. This process may also be handled automatically by pre-processing that assesses prior user input and quality of one AI's output. If prior and similar user input has a history with such AI typically results in dissatisfied (low rated) output, making a further attempt need not be pursued. Instead, the user input may be automatically delivered to a second AI that has much higher chance of delivering higher quality output for such a user query or other user input. Another approach is to use a first AI unit trained with prior user input against both (or either) second AI unit output and third AI unit output generated in response to the same user input to deliver likelihood of highly rated output. Then, the first AI unit can evaluate a new user input and predict which of the second and third AI units to handle the user input request.

Much of the above functionality described is not limited to AI units of the reconfigurable neural net based circuit units 105. Many AI's are built solely to run on other types of processing circuitry where the neural net functions are built into the associated program-code. As illustrated, these software AI models 109 reside in the storage circuitry 103 and may include particular setting information in the form of accelerator configuration data 141. These software AI models 109 run on more typical processing circuitry such as the software processing units 111, e.g., multicore processors, floating point processors, and processors originally designed to manage graphics processing. Accelerator circuit units 107 can also be employed to accelerate operations of the software AI models 109 as configured with the accelerator configuration data 141. As with the reconfigurable neural net based circuit units 105, configurations of the Accelerator circuit units 107 can be rapidly swapped in and out via quick swap storage 117 (e.g., memory or registers) so that different models of the software AI models 109 can be switched between in back and forth fashion.

The software AI models 109 may also be fully trained, baseline trained and bootstrap trained, with fine tuning and tailoring training performed for example locally to suit each particular user or user device. Each of the software AI models 109 constitute an AI element which can participate alone or with multiple other AI elements to carry out an overall function. Along with the software AI models 109, the neural net based circuit units 105 also constitute AI elements, and where all AI elements cooperate to carry out overall AI functions, wherein in carrying out such overall AI functions some active AI elements may be configured to influence other of the active AI elements in accordance with ones of the adaptive topology specifications 165.

The AI functional units corresponding to the software AI models 109 can also participate independently or along with the AI units of the reconfigurable neural net based circuit units 105 to establish all of the cooperative independent multiple AI infrastructure and interactions described above. For example, a remote massive first generative AI program-code model may run in the cloud to serve online user input queries. By saving the inputs, outputs and user satisfaction over time in the organized datasets 131, such data can be selectively used to train a local tiny (in comparison) second generative AI of a variety that operates as one of the reconfigurable neural net based circuit units 105. Thereafter, second generative AI can be used for offline modes and whenever it is likely to yield acceptable output to a user input query as outlined and determined above.

Training datasets 141 are also independently stored after extraction from the organized datasets 131. The extraction process involves application of support processing code 167 that directs the software processing units 111. This direction involves the selection, culling and refining data found with the organized datasets 131 that is useful for a particular AI input and output goal. In addition, if needed for different overall AI system configurations, processing output generated per direction of the support processing code 167 by the software processing units 111 is stored as reusable output 163 to minimize repeated processing demands. Likewise, any processing or AI element output can also be stored in the reusable output 163 should reuse be at least likely. Other output (such as support processing or AI element output) and input data (such as user, sensor and communication input), i.e., output & input data 135 is also stored within the organized datasets 131 for possible subsequent use in training or for influencing operations defined by one or more of the specifications of the adaptive topology specifications 165.

The training datasets 141 include bootstrap training datasets 143, baseline training datasets 145 and full training datasets 149 to be used as mentioned above to train one of the reconfigurable neural net based circuit units 105 or help develop one of the program-code based models. If trained on the bootstrap training dataset 143 (light pre-trained data influence) or the baseline training dataset 145 (heavy pre-trained data influence), a tailoring training dataset 147 can then be used to fine tune or personalize one of the program-code-based models 109 or one of the reconfigurable neural net based circuit units 105. Such training data sets 141 can in fact be used or reused for both types of AI functional groupings (i.e., either software AI models 109 or neural network based circuit units 105).

Over time, the organized datasets 131 grows to include new data that is delivered to the storage circuitry 103. Within the storage circuitry 103, this new data may be stored within an independent data structure or directly within the overall structure of the organized datasets 131 with tagging indicating that it has yet to be processed. When sufficient new data accrues, a determination can be made based on new data importance and volume to trigger support processing of the new data into supplemental training datasets 141 with further fine-tuned training using such new data being applied. Such new data may be moved into the organized datasets 131 for use in generating influence or in preparing new training supplements of the tailoring training datasets 147 which can be trained atop a current AI function for further refinement and tailoring. The overall importance of any element of the cached data is determined by its uniqueness in comparison with prior data already presented in prior training events. New data might include user's download data, image captures, recordings and so on.

All data initially within organized datasets 131 initially falls within unprocessed data storage within raw data 133. All AI unit and model output along with corresponding user input is added to the organized datasets 131 as well.

To drive AI functionality, user input, received via user input-output (I/O) circuitry 113, can take many forms, including for example, text, voice, image, video, motion, gestures and so on. Such user input in single or multiple forms can be used to influence or drive as input any number of AI functions, wherein such AI functions may chain together in different configurations according to adaptive topology specifications 165. Similarly, single or multiple of these AI functions deliver output that is delivered via the user input-output circuitry 113 to output elements such as displays, speakers, haptics, augmented and virtual reality devices, communications (both tethered and wireless such as via Bluetooth, WiFi, cellular, etc.) just to name a few.

Overall, the local and remote circuitry 101 adapt to provide various types of AI assisted functions in response to user input via the user I/O circuitry 113, overall system status and events, or time schedules, location triggers and any other trigger event that may justify engagement of such functions. Different AI assisted functions are defined as specifications within the storage circuitry as the adaptive topology specifications 165.

AI elements, as used herein in multiple AI element topologies, include any of the software AI models 109 and any type of the reconfigurable neural net based circuit units 105 called out in any of the adaptive topology specifications 165. And any program-code based model may comprise one or many neural networks and associated support processing functionality.

Similarly, any of the reconfigurable neural net based circuit units 105 may comprise one or many neural networks along with support processing circuitry. Such AI elements deliver output that may be used to influence other AI element functionality. Some AI elements may generate from one data type input and output of another or the same data type. For example, text in text out, image in text out, text in music out and so on. Many such types of configurations can be defined and trained, and, once trained, such AI elements become available to fill particular roles within an overall topology defined by the adaptive topology specifications 165. In particular, a minimal, pair topology might be defined as requiring a single support element (e.g., software from the support processing code 167 executed by one of the software processing units 111) and one AI element (e.g., one of the reconfigurable neural net based circuit units 105 or one of the software AI models 109 executed on one of the software processing units 111).

Some other topology specifications found in the adaptive topology specifications 165 are far more complex as needed to carry out more overall functional goals. Topology specifications may require any number of nodes of each of: a) the reconfigurable neural net based circuit units 105; b) the software AI models 109 executed on the software processing units 111 with or without assistance from the accelerator circuit units 107; c) support elements based on support processing code 167 executable on the software processing units 111; and d) support elements employing one or more of the reconfigurable neural net based circuit units 105. In addition, some topologies include interfacing with one or more of input and output (I/O) circuitry 113 and portions of the organized datasets 131.

Throughout all of such topologies, influence and weighting associated therewith flow between topology nodes. For example, a first and a second node might both output data that is delivered to a third node's input to influence third node performance. But because the first node's output is considered more valuable or important that the second node's output, the influence needs to be balanced. That is, the first node's output influence might be heightened while the second node's output influence might be lowered. Various ways of doing this are described herein in association with subsequent figures, but those are merely representative of the aspect of weighted influence as there are innumerable ways for carrying this out. All such ways and variations are contemplated and within the scope of the present invention.

AI elements can be either or both generative and discriminative. They can deliver output used for influence or for a user experience or both. Some AI elements receive user input and deliver user output. Others are posited between a first other AI element that receives user input and a second other AI element that delivers user output. Specifications define how multiple AI elements are arranged to provide overall AI assisted functionality.

For example, a first AI element might respond to user input text "I want to hear a new song" by producing lyrics influenced by prior lyrics found in songs within a user's personal prior song list stored in the organized datasets 131. Such influence could be managed through the tailoring training dataset 147 (via a fine-tuned training) or it could also be influenced by using the input text to extract prior lyrics from the data 131 for use as input data supplementation.

In the latter case, perhaps dozens of lyrics are extracted along with rankings and ratings for supplemental processing to identify personal preference for lyrical themes and musical style, genre and patterns. The lyrical themes, text, through weighted influence is combined with the user's input text through further support processing. That combined text is then delivered to the first AI element which outputs lyrics in text form. A second AI receives the lyrics text and musical style and patterns data text after itself being support processed into a single input. In response to the single input, the second AI outputs sheet music with lyrics included. A third AI receives the sheet music and along with select via processing musical style preference data and, in response, outputs a song with singer and music accompaniment. In turn, this is delivered to the user's speakers via the user input-output circuitry 113.

This entire flow including the support processing steps, influence approaches and sources, and needed AI elements is defined in a specification stored in the adaptive topology specifications 165. Specifications may be defined locally or remotely and shared. In addition to the triggers identified above that cause each particular of the adaptive topology specifications 165 to be selected, one or more specification managing AI elements can be made responsible. They can monitor all output circuitry, input circuitry (including communication circuitry), internal system status, remote network status, local environment activity, and so on, and, when such AI elements outputs reach a threshold, select and configure the local and remote circuitry 101 pursuant to a select specification to carry out an overall AI assisted function or goal.

Raw and other data being added to the organized datasets 131 also undergo support processing to identify such things as data hierarchies, categories, data types, authorization from owners, data rights management (DRM) requirements, public/private flags, copyright ownership identity, original sources, (water) marking requirements, rankings, ratings and so on. Such indications identified assist in not only selecting data items for use in training or input influence, but also helps in maintaining privacy and compensation for underlying owners. For example, a celebrity may sell a subscription of a text to voice AI element (e.g., one of the software AI models 109 or one of the reconfigurable neural net based circuit units 105) but only for local use without sharing.

Similarly, if Picasso's heirs own copyrights to his paintings, they may offer free use for local unshared usage at low resolution only and to be used only for local training as one of the training datasets 147 for a trial period. Attempting to use any specification involving any use of Picasso or another celebrity's data would require supplemental payment. This DRM management is handled as a checkpoint before launching one of the adaptive topology specifications 165 that include a DRM requirement. The trigger to such a DRM required topology specification, instead of fully blocking or beginning to configure the topology, can provide a user with payment option, associated advertising, and offer an alternative one of the topology specifications of the adaptive topology specifications 165 that does not have a DRM requirement or payment issue. This can all be handled with support processing code or with the assistance of a managing AI element (either being associated with the trigger management) as mentioned above.

In general, it is only necessary to provide training functionality for one of the reconfigurable neural net based circuit units 105 and any trained configurations can then be copied to other of the reconfigurable neural net based circuit units 105 to carry out fully trained in operations. Likewise, only one of the software AI models 109 require training supportive program-code. Using such a model, full trained operations can be conducted even by removing the training supportive program-code as it is unnecessary for copied distributions within the software AI models 109 readied for use without retraining or further training capability.

For example, a company may utilize one of the software AI models 109 configured with training support in the cloud to create a fully trained up model that is ready for deployment. To prevent any user or third party from tailoring which could destabilize or distort their model, such company may extract or block the ability to apply further training and thus lock down a model version that they guarantee quality controlled performance. Controlling return on investment may be another such motivation for restricting further training as well.

Such a company may also use one of the neural network circuit units 105 within their premises that contains silicon training support circuitry for training in their curated training dataset according to their training strategy, performance checking and for fine tuning. When satisfied, the company may then only distribute the configuration data relating to run time operations and require removal of all training capability for deployment into any user device. This approach also benefits from allowing user devices to have smaller silicon footprints as such training related circuitry need not be included within at least some of the reconfigurable neural net based circuit units 105.

Within the detailed description that follows, AI elements such as those illustrated in this FIG. 1, according to configuration specifications, may operate alone or with any number of other AI elements, from series to complex topology arrangements with weighted influence applied thereto where appropriate. Several examples of such arrangements are provided in association with other Figures, but one skilled in the art will realize with the teachings set forth herein that the arrangement possibilities are limitless and fall within the scope of the present invention.

Specification can be triggered by many things beyond user input. For example, any changes or status detected within or outside of a user's device (e.g., user activities outside and current internal device operations) can trigger the launch of an overall AI functionality composed of one or many AI elements. Such triggering can be fully automatic or require user confirmation to launch. Fully automatic or automated with confirmation definition being set forth in the configuration specification itself. Carrying out detection of the condition driving a triggering of a specification may be program-code defined or may be relegated to a dedicated AI element within a user device or remote thereto that monitors internal and external goings associated with the user device.

In addition, there are a vast number of different types of the software AI models 109, but the silicon constraints on the design and layout of the neural net based circuit units 105 are much more constraining. Industry standard versions and capabilities of the Accelerator circuit units 107, the software processing units 111 and the neural net based circuit units 105 are also to be considered. As newer standards and versions of such circuitry arise, new models of the software AI models 109 and new versions of the neural network circuit configuration data 121 will arise which are incompatible with older user devices.

To accommodate this problem, software translators (not show) convert new models and new configuration data into forms that may be utilized by such older user devices. Even new lower cost devices and those with battery limitations, for example, may be unable to operate with the newest models and configuration data and such. Translators solve this problem. Such translators may complete a translation fully once during an installation (or configuration) of a new AI element (with the new model or new configuration data therein) or the translation can be performed in real time even in an interpretive mode.

Other translators are designed to convert any of the software AI models 109 into the neural network circuit configuration data 121 without having to engage in retraining. Similarly, translators convert the neural network configuration data 121 into the software AI models 109.

Moreover, if a user device is unable to perform an operation for one of a plurality of AI elements needed for a particular overall AI function, that operation can be performed in the cloud with results integrating back into the overall flow of the needed many AI elements. In other words, some of the configuration specifications of the adaptive configuration specification 165 may define multiple AI element operations needed to complete a desired function. These AI elements can each operate locally or remotely or with some being local and others remote. This can be: a) per specification callout; b) due to any AI related resource constraints or loading; c) due to AI model requirements (e.g., requirements relating for example to the software processing units 111 or accelerator circuit units 107); and d) the neural net based circuit units 105 being absent or incompatible. Each support processing element involved may similarly be defined or redirected on the fly to operate across one or both locally and remotely.

In these ways, any user device, no matter what underlying configuration and capability restrictions they may have, may utilize any of the AI elements and supporting processing to carry out any single or multiple AI element functionality under most any circumstance. In addition, this embodiment of the local and remote circuitry 101 was presented herein to provide specific examples of generally broader aspects of the present invention. Accordingly, the scope of various aspects of the present invention should not be limited by particular characteristics of this or any other particular embodiment set forth herein.

Figure 2:
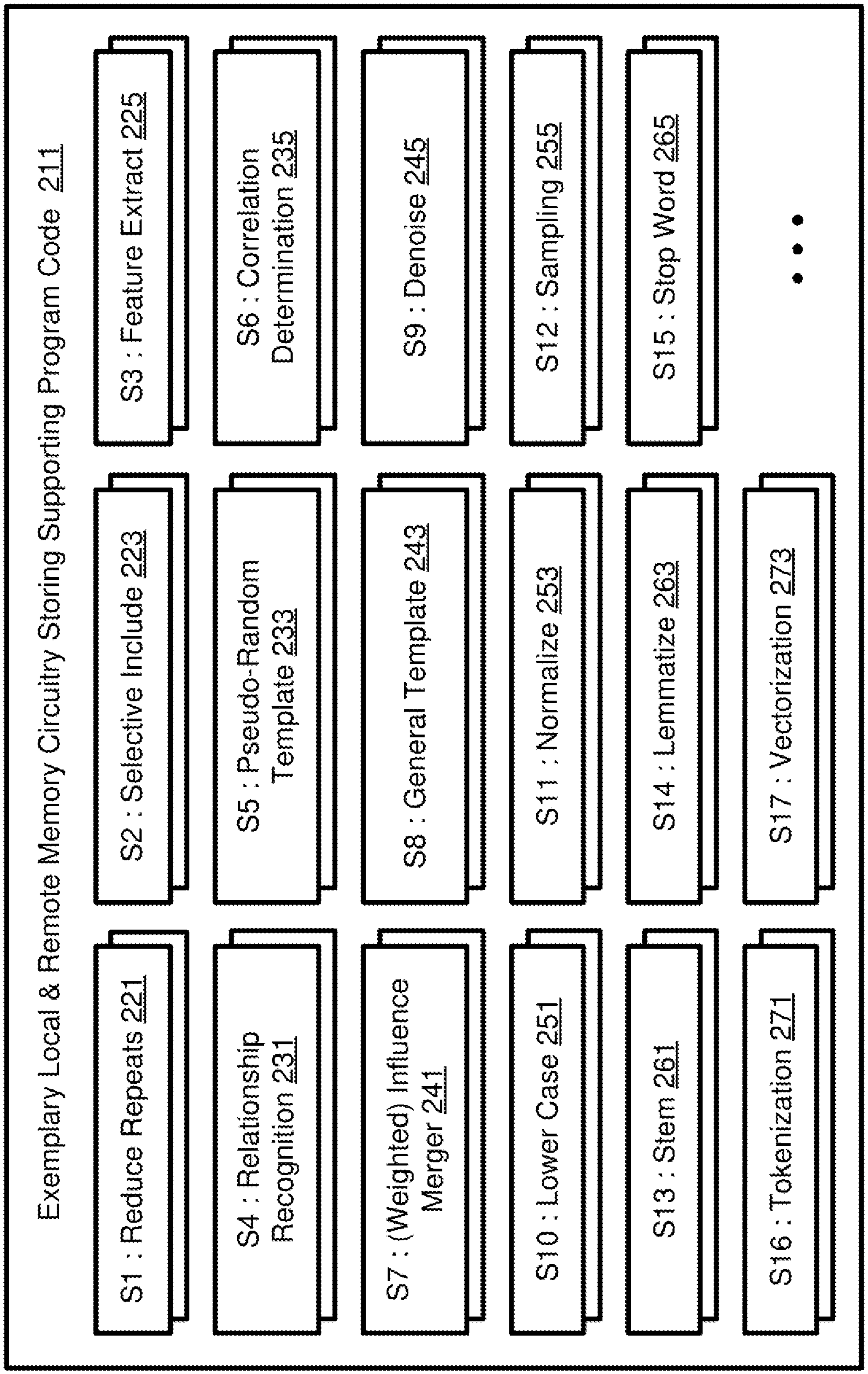
FIG. 2 is a schematic diagram illustrating an exemplary embodiment detailing a subset of support processing that may be stored within the support processing code 167 (within the storage circuitry 103 of FIG. 1), wherein such support processing provide assistance to one or many AI elements of a multi-node AI topology in accordance with various adaptive topology specifications.

FIG. 2 is a schematic diagram illustrating an exemplary embodiment detailing a subset of support processing that may be stored within the support processing code 167 (within the storage circuitry 103 of FIG. 1), wherein such support processing code provides assistance to one or many AI elements of a multi-node AI topology in accordance with various adaptive topology specifications. Support processing elements such as S1 211 are stored within the support processing code 167 (FIG. 1), and they execute on the software processing units 111 (FIG. 1), or at least on one of the software processing units 111.

For the S1 211, the "S1" is a shorthand identifier for a support processing element that reduces repeats. Similarly, S2 through S17 are shorthand identifiers used for referencing a corresponding number of other support processing elements that facilitate processing of inputs, processing of influences, computation, influence analysis, output generation, presentation, generation or assembly of templates, etc. These support processing elements operate on output of other nodes and some of those nodes touch on the edges of a given topology, they touch user data, inputs, outputs, ranking. In general, they are also nodes that participate to assist in carrying out at least a portion of the overall functionality sought by each of the adaptive topology specification 165 (FIG. 1). Also, the shorthand identifiers introduced in this figure (S1-S17) can also be found in subsequent figures herein.

Any of these underlying functions associated with the support processing elements of the supporting program code 211 alone or in groups could be performed by a single AI element. For example, such one or more support processing elements can be replaced by functionality carried out by a particular one of the reconfigurable neural net based circuit units 105 (FIG. 1) or within a software AI model 109 (FIG. 1). Thus, the supporting program code 211, depending on the embodiment, need only include those supporting program code 211 functionality that is needed within given topology specifications and that are not being otherwise performed by one or more replacement AI elements.

For example, support processing elements such as S10 251 (lower case conversion), S13 261 (stemming conversion) or S14 (lemmatization), S15 265 (stop word removal) might be handled by a single replacement AI element. S16 271 (tokenization) and S17 273 (vectorization) might also be combined and handled by such single replacement AI element. Such a combination though may not prove justifiable as normal processing via the software processing units 111 (FIG. 1) may quickly and accurately function best for this and other support processing tasks and groupings. The higher the support processing complexity, the more likely AI replacements will prove justified. For example, to carry out influence weighting across many influence sources, the complexities required and output performance when using the support processing code 167 (FIG. 1) version may be outdone in quality and power requirements by a replacement AI element, e.g., replacing for example S7 241.

Similarly, although each of the support processing elements within the supporting program code 211 are illustrated separately, they can also be grouped into a single unit of support processing code 211 for use in a combined and simultaneous or sequential manner whenever such a combination minimizes processing burdens. Such replacement AI elements may operate as all AI elements may, via the neural net based circuit units 105 (FIG. 1) or included as or within one or more of the software AI models 109 (FIG. 1) that execute via the software processing units 111 (FIG. 1).

Each instance of each support processing element S1-S17 221-273 are designed to service a particular needed function at least once in at least one node within at least one topology of the adaptive topology specifications 165 (FIG. 1). Such support processing elements are referred to herein as a "support processing topology node" or merely a "support processing node." When more than one of such support processing elements are combined for example in a series or parallel single program code unit, they too are referred to as a single "support processing (topology) node." A support processing topology node might operate on the output of a previous topology node, wherein such previous topology node might be a support processing topology node or any other type of topology node such as a generative AI element topology node, input topology node, output topology node and so on. Some support processing topology nodes operate on only one input flow and others process multiples. Likewise, they may be configured or designed to provide a single or multiple outputs.

Some support processing topology nodes operate on raw or organized data. Others interface with input and output circuits, communication circuits and other internal or external, remote or local circuitry. Such interfacing of support processing topology nodes extends to other independent or supportive AI topologies, operating systems or application software (Apps). If so configured, support processing topology nodes may produce outputs of probability data, trigger data, alerts (any local or remote important change in status), and, of course, textual, image, video, sound, voice and all other media type data flows for any purpose including for influencing AI elements or any topology nodes for that matter.

Support processing topology nodes also deliver output to any one or more other topology nodes, into data storage, Apps, input or output circuitry, and to cause internal or remote triggers of other AI topologies and Apps, including both launches and terminations. Such triggers may also shift some or all active topology node operations between local to remote locations. In most cases, the support processing topology nodes deliver output for use in ongoing influence, as can be discerned from the support processing elements illustrated within the supporting program code 211, but many more are contemplated as topologies demand although not identified in FIG. 2 specifically. Moreover, output of any of the support processing topology nodes may, in addition to immediate use or instead thereof, be stored away for later use or reuse to influence other topology nodes or for later use within training datasets. For example, an instance of the S1 211 which reduces repeats in textual personalization data with output to be used to influence a first AI element may also have such output stored away for use later by a second AI element in an entirely different topology, to reduce the overall burden of performing the S1 211 functionality twice or more.

S2 223 support processing element selects subsets of raw or processed data stored within memory, e.g., within the organized datasets 131 (FIG. 1). Such subset selections allow for appropriate training set selections and for influencing any other topology node. Therein, the selection itself providing a tailoring of the vast amount of stored information within the organized dataset 131 (FIG. 1) into a subset form such that appropriate influence or training set selection can be accomplished. For example, the S2 223 may select only a set of photos of family members from the organized dataset 131 (FIG. 1) to be used as part of the training datasets 141 (FIG. 1). Another instance of S2 223 may select locally stored poems rated highly by a user within the organized datasets 131 (FIG. 1). Such locally stored poem extractions by S2 223 being delivered as input into, for example, S3 225 wherein certain features of the extractions are identified for use as influence an output of a text to poetry AI element, wherein such functionality being defined within a particular poetry writing topology tailored to employ a user's personal, historical poetry preferences.

S4 231 is a support processing element that if standing alone comprises a support processing node when used within an overall topology. S4 231 might also be combined with other support processing elements within the supporting program code 211 into a single support processing topology node. This grouping or solo contribution to one support processing node applies to any of the support processing elements of the support program code 211. The S4 231 processing code, depending on the particular instance or design (as there can be many different versions as S4 231 represents), finds and emphasizes relationships in one or more sources of input. Such emphasis may affect training data set construction and influence of other topology nodes or elements. Multiple text inputs received by one version of the S4 231 compares each text input with the others and finds correlations and differences.

Similarly, S6 235 performs a similar function but amongst images. S7 241 might then respond the S4 231 identified relationships and create a merged influence output that balances and weighs the value of one of such text inputs against the value of others. For the S6 235, the correlation determination can lead to further cycling until underlying two or more images find acceptable correlation levels, such as during an AI element training event. The S7 241 may also have separate instances for when a topology is not to be segment processed. Other instances of S7 241 may handle segmentation, and where each segment in a sequence is assigned a particularly different S7 241 design. In this way, a weighted influence merger in a first segment made by a first instance of the S7 241 might be different than the subsequent instances of the S7 241 to perform a different weighting across influence sources or drop or add influence sources in conducting a segment merger.

Similarly, any of the support processing element within the supporting program code 211 may be applied by a single instance or design across an entire topology final output. They may also involve a single instance with segmentation defined topologies so long as the same treatment is all that is needed. But when such support processing needs to differ from segment to segment, separate versions (instances or designs) of each of the processing elements within the supporting program code 211 can be provided to service one or a subset of the total number of segments required.

For example, in a first chapter of a novel to the last chapter of a novel, each chapter has different influence and other support processing needs from those of the other chapters. Thus, for example, in a 30 chapter novel format (defined by for example within a novel type template), each chapter might be produced as a segment and wherein a number of the support processing elements such as S7 241 and S5 233 provide differing processing functionality depending on the chapter segment being generated. Like a first template and a first influence balancing merger for a first chapter and so on, and for any of the other processing elements. This can take the form as independent program code for each chapter of for example S7 241, or a single combined program code for S7 241 that considers the chapter and adapts to provide the desired output. That is, many dedicated processing elements for each segment (or subgroup of segments) or one adaptive support processing element that adapts performance for each particular segment.

In addition, the S5 233 and the S8 243 provide template usage related support processing wherein specific influence in a controlled manner can be delivered to influence a single full output goal of a single topology or to carry themes, context and style across a series of segments of a segmented topology. Such themes, context and style, along with other factors, constrain generative AI elements. For example, templates are used to drive influence for a typical spy thriller in a chapter by chapter segmented topology generation complies with what a user might expect from such a novel if human crafted. Thus, a well-defined template set influences segment by segment (i.e., chapter by chapter) generation such as chapter count, each chapter context flow, and typical expectations from a chapter 1 versus that of a final chapter. Template sets, one per segment or chapter in the novel based example, need to maintain context, hold to genre, style and format expectations, and in the case of S5 233 also introduce pseudo-random influence to inject a controlled amount of often surprising, amusing, personalized and enjoyable subject matter as the storyline progresses.

No matter if produced by S8 243 or S5 233, single templates and template sets (the latter for segmentation processing) are constructed initially from stock formats often provided by third parties which target a particular type of output generation such as a singalong book, a horror novel or a comedy video. These stock formats seek to influence theme, context, style and flow. Atop this stock format, further template tailoring involves adding in a user's private data, rankings and ratings in an attempt to produce an output that satisfies a particular user.

The S5 233 provides for more variability in template or template set generation through the addition of lists of possible influence data selected from third party sources or from the user's private data storage. By randomly choosing from these lists, i.e., a pseudo-random selection as the lists are limited in length, relevant variability can be injected into a template or template set that a user may be happy to find. For example, a novel targeting template set might include family members (as protagonist and side-kick) if prior novel generations using this approach were found by the user to be welcome. Such templates can be constructed locally or from third party providers located remotely. Templates can also extend and withdraw influence constraints and intensity across an entire topology and all the way to the very end, e.g., including affecting final data assembly, presentation and so on.

Some instances of S9 245 apply to text, some to audio and to any type of input data in any form. For example, a textual Internet page contains a mire of often unrelated information (i.e., noise) that is not desired for training or use as influence. The S9 245 works to extract the text of value from all of the noise. Similarly, other instances of the S9 245 separate background noise from a speaking human collected from a microphone. For images, noise might include far background visual items or watermarks for example, with these being removed to create better input images for training or for influencing AI elements designed to receives input images.

The exemplary local & remote circuitry storing supporting program code 211 provides processing support wherein a preliminary processing can be conducted using inputs such as user inputs and then more aggressive processing is executed, such as by implementing a tree structure of support processing, with the goals of each stage in the tree structure involving putting the output in a condition where it can be consumed by any one or more of the AI nodes and other types of nodes in the topology.

In one configuration, to generate an essay about a particular subject, for example, several web pages of internet based data are retrieved as initial input that is identified from a search engine styled support processing element of the supporting program code 225 (not specifically shown in FIG. 2), wherein the search is based on an input query. Once the pages of internet based data is retrieved, the S9 245 provides cleanup or denoising as described above. The output of the S9 245 is then processed in sequence by the S10 251, S14 263, S3 225 and S4 231. The S7 241 takes over and merges the output of S4 231 with for example a template such that the output of S7 241 can be used to influence the text generation of the essay by a text generating AI element.

In addition, the same user query is also delivered to a second support processing element, the S16 271, which reduces the user query down to a set of tags. These tags can be reused multiple times in a single more complex topology and can be saved (within the organized datasets 131 of FIG. 1) for later use in training, reused in the present topology, and reused by any other topology or application. The actual user query can be similarly stored and reused. Lastly, the set of tags (employing if necessary S17 273) are delivered to influence any other topology node such as an AI topology node such as one that uses a small set of tags to influence generation of a complex image output. This is a simple exemplary case of staged processing.

Versions of the S14 263 may not only perform lemmatization to enhance influence on a word type by word type importance basis, but also may accompany the stripping out of words of types that are less important than others. For example, one version of the S14 263 strips out all articles. Another takes out articles and prepositional phrases. Doing these things inherently changes influence weighting as many words that might otherwise provide influence are no longer present. Similar aspects are encountered for S3 225 feature extraction, which can occur over one input entry, any data storage, internet data, and across input streams. In some versions of the cases might involve a version of the S6 235 where correlation across multiple streams of influence occurs and that two can involve tossing portions of the streams with little correlation.

Regarding the S4 231 relationship recognition support processing, forward and backward relationships within a sentence or across two sentences or more identifies a common context that can be emphasized in influence to keep the generating AI elements on track. Such relationship recognition in other versions of S4 231 operate between different influence data and not only within one such as the single sentence by sentence source version mentioned above. In addition, relationship recognition spans beyond text to any medium of communication such as a sequence of images wherein relationships such as style, color palate, brush strokes, etc., can be identified and emphasized to influence future generation of images. In addition, even image content elements can be identified so as, for example, a dog in one picture and a dog in a subsequent picture seem to be related and not two different dogs when an image series involves a telling of a visual story.

In an exemplary generative AI topology, two completely different AI element's outputs are taken where each may employ different processing elements before and after AI model/circuitry execution, and their outputs may go to local data storage, and to factor in user preferences for generating the outputs, the processing thread may lead to user input steps as well as steps prescribed by the S8 243 preferred template or by retrieval from the S5 pseudo-random template set production steps, and all of these (user inputs, templates, etc.) combined, may be delivered to one or more AI topology nodes and/or one or more other types of topology nodes such as a support processing node.

Normally, different sources of influence converging on a single topology node cannot be treated equally. Typically, one will be favored over others and together, a value ranking of many influence sources might need to be carried out. This process of not treating all converging influence sources equally is referred to herein is "influence balancing" or "influence weighting." Support processing elements of the supporting program code 211 can carry this out in a few ways. First, heavier restrictions that effectively reduce the influence of one source over another can result from applying more or less aggressive support processing. For example, for a textual user query, support processing might correct spelling but otherwise deliver all of the original user query for merger in S7 241 with a personal data influence that has been heavily processed by numerous of the support processing elements within the supporting program code 211 which dramatically reduces the number of tags to be used. This type of influence weighting is created by applying different (often more or less aggressive) support processing treatment to each source of influence data.

In addition, influence weighting may be carried out through support processing elements that work across two or more sources of influence data. For example, an instance of the S4 231 can treat the textual user input query as being of highest importance and only selecting from other influence source data only a fixed list of most important (e.g., most unique) text items from the other influence sources that exhibit high correlating relationships with that of the user input query text items.

Thus, behind many support processing topology nodes with multiple inputs, there are often more than one support processing element such as those found within the supporting program code 211 that work together to provide for influence balancing by adjusting influence weighting corresponding to each input internally and/or across such inputs.

When multiple influence feeds are received for a generation of new content, for example, a template influence text and a personal data based influence text are received, they are processed and combined by the S7 241. This merger likely involves influence weighting wherein influence text from a template may be prioritized and establish the baseline output of the merger with only the most important text from the personal data being extract and added to the merged output by having a single advanced S7 241 or having S7 241 along with several other of the support processing elements such as those illustrated within the supporting program code 211 combined into a sub-topology within a single support processing topology node.

In one configuration, a user query for generation of a novel/storybook about a dog is received and processed. To determine influences on this activity, such as list of books/novels recently read by the user, ratings that user has provided for each of those are to be considered, as ratings are an important aspect. In addition, ranking of books read by the user or those from other similar users and their rankings or even 3$^{rd}$ party organization recommendations may be factored in. Any pictures of dogs or information on dogs in the user's email or photo gallery will be analyzed for other influence. Regarding support processing, elimination of repeats of terms or even photos and so on may be deployed via instances of S1 211. If pictures of a dog are located in the user's data (email or photo gallery's etc.) then the breed(s) and attributes of those dog(s) is determined and factored in, with a combined influence textual description of the same being generated.

In order to generate the novel/storybook, an AI topology node itself might choose to discard or mute particular of these specific influences as well inherently within the AI element itself or through further support processing applications such as those illustrated within the supporting program code 211. Such AI topology node discard or muting itself is influence weighting, also known as influence balancing. Such a decision to discard or weigh a particular portion of influence may also involve particular characteristics of a particular user. One may rank full influence highly while another might prefer some influence far above other types and may not like particular influence at all. This being determined over time by user ratings of a good sample set of outputs. It may also be determined by comparing a new user with other users and finding that certain characteristics of a new user aligns and correlates well with a group of users that have a certain influence balance (or influence weighting) that is different from other groups or classes.

User classes can involve any influence balance relevant groupings by their own characteristics such as age, gender, location, earnings, profession, education, prior history, historical ratings, and so on, and can be identified from at least a portion of a user's personal data that may be stored both locally and remotely.

Influence balancing that takes into consideration a user's personal characteristics or any other factor to block an influence source or add another and along with associated influence balancing, may be carried out with an adaptive multiple input influence balancing topology node that can service all user classes or by substituting one of a plurality of possible influence balancing nodes with others which each being designed to service a particular one or subset of user classes.

As used herein, influence balancing includes decreasing (even to the point of selectively blocking) and increasing influence contributions of a plurality of influence data from a plurality of influence sources. For example, with five influence inputs, an influence balancing topology node may fully block the first influence input, leave the second and third influence inputs untouched, decrease the intensity of the fourth influence input, and elevate the intensity of the fifth influence input.

With textual influence underlying, each of these five influence inputs might consist of a series of words received from five different influence sources. Blocking of the first influence input would consist of ignoring any of the series of words within therewithin. The series of words in both the second and third influence inputs would then remain untouched, while the series of words of the fourth input would be reduced in number. To elevate the fifth series of words within the fifth influence input, such words receive special treatment in, for example, the merging process.

For example, if the first influence input's set of words were extracted from personal data and the user is from a class that does not enjoy personalization, the influence balancing topology node might fully block the first influence input's set of words from a merger of influence (e.g., via S7 241 type processing). The second and third influence input might be extracted from two different influence sources found remotely that all users have historically ranked highly when used to for example create a romance novel as the current user has requested. The fourth influence input's set of words might be extracted from current events or other current topical words of interest brewing in society at large. The current user (or user class) may indicate historically that a light touch of such influence should only be applied. Finally, the fifth influence input flows from within the current topology wherein the fifth influence is critical to maintain context and correlation throughout an overall single or segmented generation of output.

This exemplary backdrop sets the stage for the above blocking, acceptance as is, reduction and heightening of each word set from each of such influence sources. An example of heightening can be where the fifth influence input's set of words are used as the baseline from which other allowed influence word sets are evaluated. If the others introduce too many significant words and sequences that will derail context and output flow correlations, those other words sets, like the fourth influence input's word sets will be reduced by discarding some of the words in the set. This, for example, can be managed by influence balancing node built with merger processing support, e.g., S7 241.

More generally, to carry out merger processing that is specifically tuned to a particular user or user class, there are two options. The first option is to employ an adaptive merger support processing topology node (wherein the merger processing takes into consideration the user and/or user class characteristics and tailors the influence weighting to tune to the current user). The second option involves deploying a first fixed merger topology node selected from a plurality of fixed merger support processing topology nodes with each of such nodes being designed to service a different user class, and wherein the first fixed merger topology node being configured to service only the user class in which the current user is considered a member.

Such influence balancing topology nodes may involve influence balancing and merger within one element of the support program code 211, such as S7 241. It may also comprise all or part of the influence balancing performed by other topology nodes involved in the delivery pathway of each influence input flow. There may be an adaptive or one of a selected number of influence personal data extraction support processing code, e.g., the S3 225, involved that deliver pre-weighting to an influence source data set.

For example, consider two sources of influence to be merged, personal stored text and user's input request. The user's input request is processed by a first or several support processing nodes to carry out, for example, S1 221, S10 251, S15 265 and so on, with the output being a word set designed to provide influence to one or more downstream topology nodes. In addition, such support processing nodes may be adaptable (or are dedicated through selection in a fixed manner) to specifically service this class of user by, for example, reducing the influence output set of words by adding other support processing such as S14 263 and performing associated word type extractions. In this way, the user's input request's influence can be influence balanced even before reaching merger support processing.

Similarly, to service the present user's class, the S3 225 only extract a very short set of text having only highest relevance and correlation to the user's input request's influence word set. This is accomplished not only by utilizing the user's input influence word set to direct a query into the personal data, but also by changing the extraction threshold (via a pre-tailored version or adaptive version of the S3 225 targeting the current user class) for inclusion within the personal text set to be used to influence downstream topology nodes.

In this way, the two influence sources deliver two pre-weighted influence inputs to one type of the S7 241 support processing topology nodes, which then may simply combine the influencing words sets into a single influence output that may then influence a generative AI node, for example. Even when such pre-weighted influence balancing performed on each influence source occurs, a merger support processing topology node (e.g., a version of the S7 241) may still assist in influence balancing by, for example, prioritizing at least a portion of one influence input over another.

Of course, such a merger may be unnecessary as well if the topology node receiving the input requires no merger, and, for that matter, even the influence balancing itself associated with each influence input need not be performed. For example, an AI element may be trained with two separate influence inputs and can internally converge on an adequate influence balance such that when in use, it effectively performs all of the influence balancing needed. In such cases, specific training may be provided by user class such that the resulting operations of such AI element may be tuned to service that particular class. Other trainings (including using baseline 145 and tailoring 147 approaches set forth in FIG. 1) can be used to create particular AI elements that are tuned for the current user based on class membership. Merely deploying the specific class servicing version of the AI element may be all that is needed.

Alternatively, one adaptive version of such an AI element can be trained. To do this, such AI element also received class information as part of the training set as input. In this way, although likely with a much bigger training requirement one multi-class AI element may be deployed in the overall topology.

In sum, topology nodes can be dedicated to service a particular user class or can adapt to service all user classes. A user through their own historical interactions can define their own personal user class with only one member, themselves. Still, in this situation, all of the above adaption or selective deployment of any node in the topology can result to tune everything from influence balancing to overall output generation. In other words, influence balancing can involve the overall topology itself. One user may have a set of personalized topology specifications with a certain number and layout of nodes that are unique to that user or at least unique to a class of users. Such personalized topology inherently carrying out influence balancing by inclusion and absence of possible influence flows (and absence of nodes associated with such flows) and balancing approaches (missing or present nodes and associated support processing all of which impacts influence). Moreover, even the number of AI topology nodes may differ or be absent from one user or class of users to another.

For example, a book writer topology specification for a child (user class) might be completely different from a book writer for an adult (user class). For a young child class, the topology might highly favor influence involving a child's own family members and pets. Such influence may be balanced so highly that all books written by a generative AI might include those members and pets as main characters. For an adult class, the topology many not involve extraction or inclusion of family and pet data from personal storage, and all those associated nodes would be absent. Yet some adults may indicate through their personal data itself and history for liking personalized books, that they are placed as the lead role in all of the generative AI book outputs. Such adults may fall into a subclass, and with this subclass having a particular topology and weighting tailored or tuned to service this particular subclass of adults. Therein, even the nodes that do exist would of course also perform differently so as to best serve that particular user. Thus, as can be appreciated, certain topology nodes and certain topology groups of nodes might be substitutable or merely fully removed from a plurality of other counterparts and wherein the performance thereof offering a best fit for a user or user class. If for a user class, then adaptability of a topology and elements at least to tune the user calls operations to better fit the user member being part of the node or group of node design.

For example, in a topology that supports a particular class of users involving generating and merging influence from user input text and influence from personal data, the user's input text may be considered of highest value and be delivered without support processing to a merger support processing node, e.g., one version of the S7 241. Such user's input text may also be delivered to influence a search to extract relevant and important excerpt text from the user's personal storage. Because this class of users does not value such personal excerpts highly in the current overall topology's output A, a particularly high inclusion threshold is applied by a version of the S3 225, such that a very small amount of highest correlating personal text is extracted and used as influence.

A merger support processing element, e.g., one based on a version of the S7 241, receives and merges the user's input text influence and the personal text influence without having to perform further influence balancing. For example, by merely combining the two sets of text into a single set of text which is then delivered as an influence to (or toward) one or more downstream AI topology nodes. Alternatively, a different version of the S7 241 would be employed for a different class/subclass of user, or based on evaluating the current user's historical data. Such alternate version of the S7 241 could apply yet another level of influence balancing, such as favoring the personal text set of influence over the user's input text influence. For example, the personal text set of influence might be the baseline and included in the merger, while the user's input text receives an influence downgrade by eliminating the most uncorrelated words or by removing certain word types like those too commonly found in natural language speech. Thus, user class can establish a baseline topology and overall operation but a user's own peculiarities can drive a tuning of such baseline topology and elements therein for best performance for each user in a class.

Regarding such tuning, adaptable version of any node that services all classes of users might be employed for particular nodes deployed. In others, a single fixed version may also service all classes of users. But for other nodes that benefit heavily from tuning, they may be designed to be adaptable to service all classes, or comprise a selection process where one version of a node is designed for one class of users, while other versions of that node are designed to serve many other classes of users. Moreover, one version might actually consist of several nodes versus another version consisting of a single node and so on, and with each one or more "versions" of topology segments being the substitution element(s) involved. In addition to having such adaptable topologies, complete dedicated topology specifications defined to service particular user class can be used for particular overall topology goals. In this way, the starting point for serving a particular user might be to select the appropriate topology for the user class, populate the topology with nodes that also best service the user class, and finally to provide adaptability within that overall configured topology to tune in or tailor to best serve that particular user of the user class.

Other factors beyond user class and specific user tuning applies to overall topology selection, topology node versioning and node grouping sub-selections, and underlying ability to fine tune or tailor nodal and overall performance to best serve a particular user to achieve a highly user rated overall generative AI goal. Such factors include but are not limited to the user's device involved, local processing loading and capabilities, battery power conservation status and needs, and availability of sufficient remote alternatives along with remote performance capabilities over that of local nodes. All of these such factors along with user class and a user's historical personal data drive adaptability through topology architectural layout to picking node versions and fine tuning as mentioned above.

Many of such factors such as user class and the involved user's device do not usually change during production of an overall generative output goal. The same cannot be said about many other factors such as battery power state, internet connectivity and loading due to sharing of resources. Even real time streaming generation goals further complicate by making resource sharing and waiting unacceptable. Thus, adapting not only in response to a change in such factors or conditions may in some cased be reactionary but in others, predictions of upcoming problems drive triggering of some form and specificity of adaptation of an in use topology.

For example, a battery power depletion onset status may trigger, during a topology's operations, a switchover to alternative lower power versions of certain nodes, to counterpart remotely located nodes, dropping influence source pathways to save the underlying power needed therefor, and even simplifying an overall topology by dropping AI elements such that a lower quality output is delivered instead of failing completely when battery power fails before an overall output from multiple generative AI's have completed the overall goal of the topology. Such power saving and other adaptive changes can also be applied to node subsets, or can involve switching to an entirely different topology specification in real time, for example. Such real time switchovers of all types can also be synchronized to happen when a full generation of a segment has completed in a multi-segment defining topology if time permits. Otherwise, the switchover can happen instantaneously with mid-completion AI generations being abandoned and reproduced in full under the switched in alternative or adapted topology.

For story generation according to one configuration, the text from all books read by the user (that the user rates highly) can, instead of employing supporting program code 211, be processed by a generative first AI node that delivers a user's personal book influence (such as a template or template set, tag set, and so on) to a second AI element that will generate the story under such influence. Such influence output might include themes, context, story flow elements along with aspects of heroes and villains and so on to generate influence that increases the likelihood that the user will find the new generated story with high rating. As noted, this influence may involve preparing sets of influencing templates to guide chapter by chapter segmented generation.

Alternatively, the generative first AI node that produces the influence may be discarded, and the user's like books can be directly trained into the second AI element. Based on that training, it is more likely that future books written by the book writing AI will deliver an output that the user will rate highly. To accomplish this, a baseline training set of the stored baseline 145 (FIG. 1) trains the book writing AI in the first stage of training. During the second stage, the user's own highly rated books stored as one of the tailoring 147 training sets is applied. For the baseline 145 training sets, books gathered from highly rated by all users might be employed. Then other intermediate stages of training via the tailoring 147 training sets might be constructed based on genre and by user class rankings and even by user devices used in the generation itself. Then the tailoring or fine tuning for the user, the user's genre preference, and all other personalizations along with the location of operations (including remote, local and device constraints) to define through training a local or remote generative AI element that can be used to write a best story under the current circumstances for a current user.

Moreover, when any current circumstances cause a predicted output quality to likely prove unacceptable to a user (e.g., where any available swapping or relocating nodes, versions or topologies won't be sufficient to adequately improve the likely poor results, a substitute previously generated output created for another user within the present user's class is delivered which such other user found to be of highest quality. This approach illustrates that generative AI topologies themselves can be substituted out with generation created for other similar users that such similar users found most acceptable, and such reuse in overall generative AI output is often the most viable solution. To enhance this topology output reusability, only previous output without personalization used in the creation process may be freely shared or where other users whose private data was used for personalization provide authorization with or without requiring an associated payment and digital rights management control.

Sharing of human evaluated and high ranked previously generated AI topology output helps to also minimize the processing load associated with the generative process plus utilizes human perspectives on what constitutes a high quality output. Thus, many users may prefer to use widely shared and widely acclaimed generated AI topology outputs. Others may prefer the personalization and uniqueness most closely tailored to their own preferences. By often turning to other users' generated output and providing ratings thereof, such output with highest ratings can them be used to fine tune through tailoring training sets based on such output or through selection of topologies used to generate the highest desired other user's output. To this end, the underlying topology used along with all of the underlying node versions plus trained AI elements used can be shared. Thereafter, one new user can establish another user's configurations for a particular topology that will then most likely deliver successful generated outputs for the new user. Then, along with ratings of the generated output by that new user, the other users defined topology can migrate in a tuning fashion to best service the quirks and peculiarities of the new user.

Figure 3:
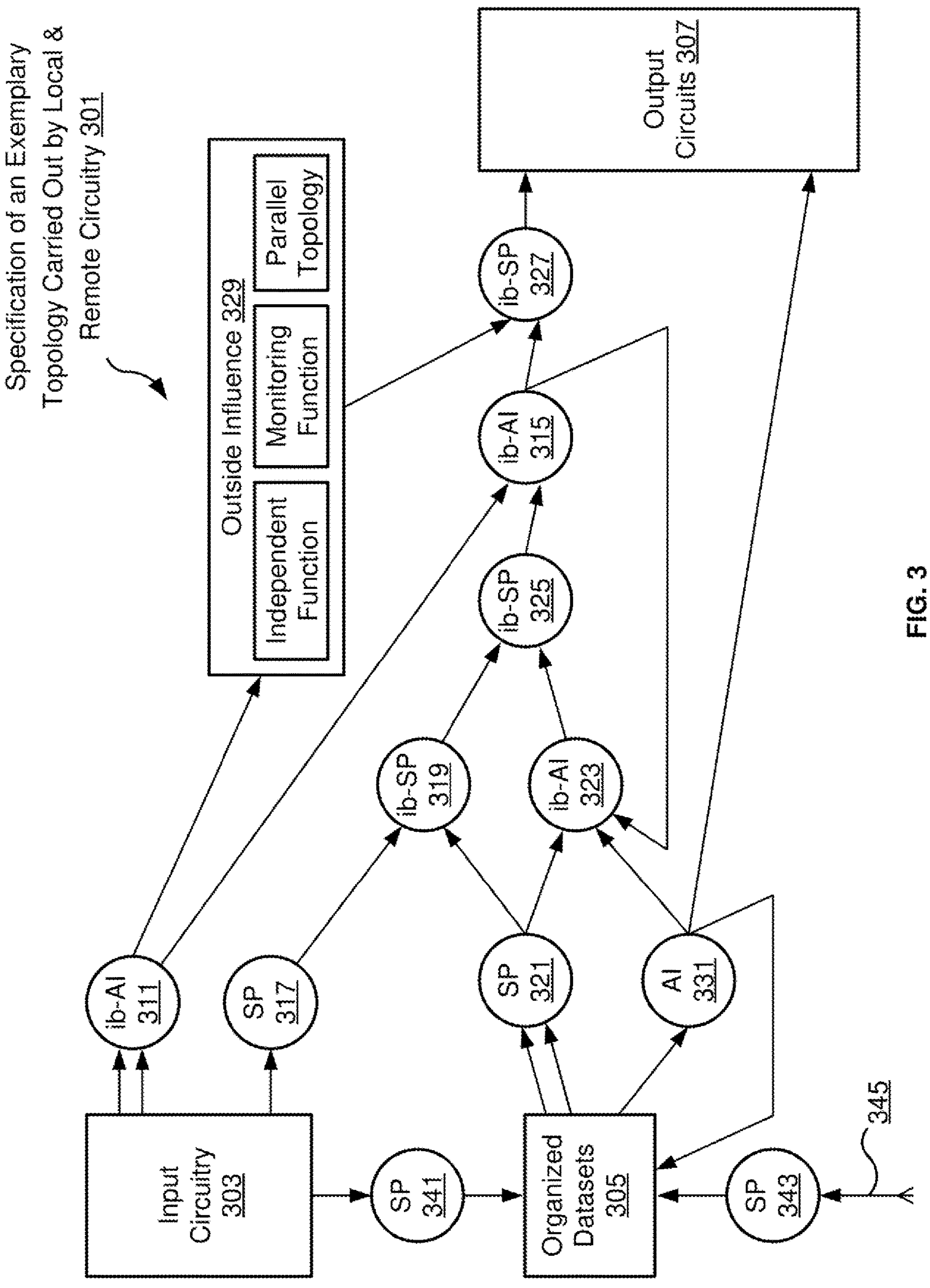
FIG. 3 is a schematic block diagram illustrating internal cross node influence balancing associated with an exemplary multi-node AI topology in accordance with and illustrating various aspects of the present invention.

FIG. 3 is a schematic block diagram illustrating internal cross node influence balancing associated with an exemplary multi-node AI topology in accordance with and illustrating various aspects of the present invention. Pursuant to an overall adaptive topology specification, an exemplary AI topology illustrated includes a plurality of AI nodes (herein also referred to as "AI elements") and a plurality of SP nodes (herein also referred to as "Support Processing elements"). Along with various data storage, data feeds, and outside influence data, the topology illustrated delivers output associated with the overall purpose or goal of the AI topology.

Specifically, in this embodiment, an ib-AI (influence balancing Artificial Intelligence node or element) 311 extracts from two independent input data flows from input circuitry 303. These data flows may be any of user input, sensor input, communication received input from remote sources, and so on. Because each of the input data flows are not either equal in value or service entirely different usage needs, the ib-AI 311 is trained to balance influence. That is, the ib-AI 311 is trained to treat a first of the two input data flows more significantly in its generation of outputs than a second of the two input data flows. This is but one example of internal influence balancing.

A support processing node 317 has no influence balancing requirement as it only receives a single input data flow from the input circuitry 303. Similarly, SP 343, SP 341 and AI 331 only receive a single source of input and thus no influence balancing is needed. SP 321 is provided to illustrate that in some cases, multiple data flow inputs may be inherently equal and influence balancing is not necessary. For example, when the SP 321 extracts influence data from two independent sets of the organized datasets 305 and wherein one of the two sets is just as important to the overall topography as the other.

Most other nodes, i.e., ib-SP 311, ib-SP 319, ib-AI 323, ib-SP 325, ib-AI 315 and ib-SP 327, perform internal influence balancing wherein some of the multiple inputs must receive lesser weight than other inputs. Although only one input (no influence balancing needed) and mostly two input situations are illustrated, a great number of inputs from multiple nodes are contemplated to drive an input of a single node, and wherein the balancing of influence becomes more complex. For example, ib-AI 323 receives three influence flows as input, and many more inputs between nodes is contemplated. Here, we also find a somewhat circular influence chain. The ib-AI 323 generates an output that influences the output of ib-SP 325 which in turn influences the output of ib-AI 315 which circles back to influence the ib-AI 323. This circular nature of influence has many values depending on the topography and continuous looping may be curtailed by many means such as detecting an adequate cross correlation in outputs by a discriminative AI element evaluating correlation, a fixed number of cycles maximum, and a combination of both, for example. Many alternate strategies for circular influence pathway management is set forth herein. Such circular influence flows also span segments where a prior segment output feeds forward to influence a subsequent segment and such subsequent segment output feeds back to influence the prior segment in a circular loop. Again, there are many ways contemplated to prevent endless cycling of cross segment circular influence. Just as with other circular influence flows, controlling the maximum number of cycles and utilizing discriminative AI elements to ensure correlation thresholds are met to name but a few.

Any support processing (SP) node or artificial intelligence (AI) node that receives multiple inputs likely will need to balance the influence of the multiple inputs. If so, in this figure, this is identified with a prefix "ib" (i.e., "influence balancing"). This influence balancing is also referred to herein as internal cross node influence balancing and this multi-input topology as one supporting "internal cross node influence."

Along with input data flows from the input circuitry 303 other outside influence 329 may also participate in delivering data flows as input to one or more topology nodes. If the receiving node, such as the ib-SP 327, receives such a data flow from the outside influence 329 along with another input, that node (like ib-SP 327) may need to handle influence balancing.

Such outside influence 329 may be from any number of sources, three of which being illustrated but many more are contemplated. For example, there may be two AI based topologies running at the same time in parallel. Such parallel AI topologies may most often operate independently to carry out even two unrelated overall functions. Yet if a particular circumstance arises, an influence data flow may be delivered to the ib-SP 327 such that a second topology (not shown) exerts influence on the topology illustrated. Such influence may also be a rather continuous flow of influence but only when the two topologies operate at the same time.

The outside influence 329 might also involve an App or other software application that does not involve an AI topology. Such outside influence might deliver influence to manage resource competition, for example, and such influence might be injected anywhere or at many places within any topology. As illustrated, influence is only injected into the ib-SP 327. Similarly, the outside influence 329 might involve a monitoring function that looks at internal device goings on and occasionally or continuously delivers influence to one or more topologies.

Moreover, the outside influence 329 of all types might receive influence from the illustrated topology, i.e., ib-AI 311 might continuously or periodically deliver output generated from input data flow, wherein such output is intended to influence the elements of the outside influence 329. In other words, the outside influence 329 may influence or be influenced by the illustrated AI topology.

It should be noted that a plurality of topologies can collaborate to generate a required output such as a multi-segment story being generated based on user requests, wherein one topology receives outside influence 329 from another as the collaboration progresses and partial output segments get generated on each of the collaborating topologies. Also, when one topology acts alone without the need for collaboration, it behaves in one possibly limited way. However, when two or more topologies are involved, the second topology may enhance the first topology during the collaborative generation phases. In addition, collaboration would be managed when both topologies are online (i.e., being able to communicate).

For example, a second topology stops generating when the first topology (say on a local machine or mobile phone) goes offline. In one configuration, a first mobile device pairs up with s second mobile device, and each run a topology and are able to collaborate in the generation of a multi-segment document, music, image or storybook. Then when either of mobile devices detach, they each return to a single topology configuration and operate independently. In another interesting mode, a base topology is employed by a first mobile device for generating an output, and, if some trigger event arises, a second topology is launched which influences the base topology. And that trigger can be anything in the first topology and its interactions and environment, and everything. For example, the mere fact that the first mobile device and the second mobile device are capable of running several different stand-alone topologies means that they are designed to influence each other for coordination reasons and otherwise. In addition, some topologies on the first and second mobile devices may then only be "dependent topologies" that have no purpose other than to influence/coordinate some additional behavior for a "primary topology".

In one configuration, if the first and second mobile devices are not running a primary topology, the triggered assistant topology will never trigger on those devices as it can only run in a dependent arrangement. Imagine, for example, the first mobile device is being used for generating media in streaming form while its user wanders about and that streaming media is generated based on a primary topology. Subsequently when the user of the first mobile device wanders to a location in proximity to a friend's mobile device, i.e., a second mobile device, a collaboration is triggered wherein a dependent topology is launched on the second mobile device (when it comes into proximity with the first mobile device) to influence the primary topology. The dependent topology may, for example, weave the friend's information into the first user's stream (a fully local add on) through influencing from local friend data stored on the first mobile device. The dependent/second topology could also retrieve such information from the friend's second mobile device directly. Similarly, the second topology could be one that fully launches only after receiving a confirmation from the friend (the second user) and then the second topology begins to make deliveries of some content (perhaps a copy of that very stream) to the friend's second mobile device. In this scenario, this second topology could then not operate independently ever. It delivers influence to the primary topology in controlling ways so as to time shift to maintain synch between the two mobile devices and account for buffering and wireless network situations.

In addition, in some configurations, a dependent topology might also act as a fork. That is, it could merely just share much of the primary topology, for example the first half thereof, then fork off and serve a secondary function. This is where the dependent topology cannot operate without the primary topology being in operation. And the primary topology is fully functional with or without the dependent topology being involved.

Raw data 345 from many sources is delivered in a single input flow to the SP 343 which organizes the incoming input data into an optimal format for storage within the organized datasets 305. Input data flows from the input circuitry 303 are similarly processed by the SP 341 into an acceptable form and delivered for storage in the organized datasets 305.

Depending on the purpose of the exemplary topology illustrated, some of the AI elements ("AI nodes") may be generative AI elements and others discriminative AI elements. For example, the ib-AI 311 might receive the dual input data flows from the input circuitry 303 and deliver two associated probability outputs, one to influence the outside influence 329 and the other to influence the ib-AI 315 which may itself comprise a generative AI node that addresses such influence in its internal generation of an image, music, text, video or other type of user consumable output destined for the output circuits 307.

Another important aspects involves the AI 331 that generates an output from data from the organized datasets 305. Such output is not only delivered to the output circuits 307, it also used to influence the ib-AI 323. Such output is also stored back into the organized datasets 305 for future use to bias or influencing nodes during normal future operations but such output may also, along with the input to the AI 331, be used as training set pairs for training future other AI nodes so that they can also be used in future AI topologies.

Also note that all or any part of the illustrated exemplary topology may be found a) fully within a single user device, b) within multiple user devices, c) in the cloud, or d) at any combination of a) through c). This is also adaptive. All of such nodes might begin operation in an otherwise idle user device, but as competition for resources arises or other limitations are encountered, some of the nodes may be relocated in real time to either other user devices or to cloud servicing. Similarly, the entire topology may operate in the cloud, but as resources or performance situations change over time, a rewiring of the interconnections occurs to relocate one or more of the nodes to a user device.

Such adaptation for moving nodes around the overall remote and local AI infrastructure need not be handled on a one to one basis. For example, some nodes operating locally will do so to carry out an overall first purpose using a local topology. Shifting a node to the cloud may change a part or all of that topology to a remote topology or topology portion. For example, when more processing resources become available in the cloud, a more complex and exacting topology might be carried out there. Moving even one node locally might trigger a much simpler overall topology because of local capability limitations from processing to battery power constraints, for example. Either way, the overall functional goals of identical local and remote topologies as well as different part or fully remote topologies and part to fully local topologies may remain the same.

Relocating nodes with or without more major topology adjustments may be made with user confirmation (perhaps accepting additional fees) or seamlessly without the user being aware. To this end, topology control asserts a relocation at a logical breaking point and not just at any time in an overall topology process to avoid error insertions if possible. Otherwise, mid-generation failures for example locally might force a relation and a portion of the local generation might have to be discarded to remove errors. An example of this is in a segmentation based flow. For a children's book with a paragraph of text and an associated image on each page of the book, the AI topology can be designed to carry this function in a segmented page by page manner. For example, a first text paragraph is generated by a first AI element and that first text paragraph output is used to influence a second AI element in its production of a first image. Once this has completed, the first page can be laid out, completing the first segment, and, thereafter, the second segment (here the second page) can be created. Assuming this is being carried out by a fully local topology and perhaps time sharing demands on the second AI element because of a parallel topology usage, creates a need to shift the local second AI element to a remote counterpart in the cloud. If the transition need not be immediate, the transition can take place after a next segment (next page) completes.

If the transition needs to be immediate, for example, needing to relocate the text production of a paragraph for the book from local to remote, an attempt may be made to continue a paragraph generation in progress, e.g., where half of the paragraph has been finished and the remote first AI element picks up where the local first AI element left off. More likely though, in such situations, the incomplete segment output will be discarded and the remote first AI element will begin the segment again.

No matter whether a smooth, seamless transition or with abandonment of half efforts, a relocated one or more topology nodes will be accompanied by all of the corresponding influence flows and associated overall context to continue the ongoing purpose of the AI topology from the outset.

Figure 4:
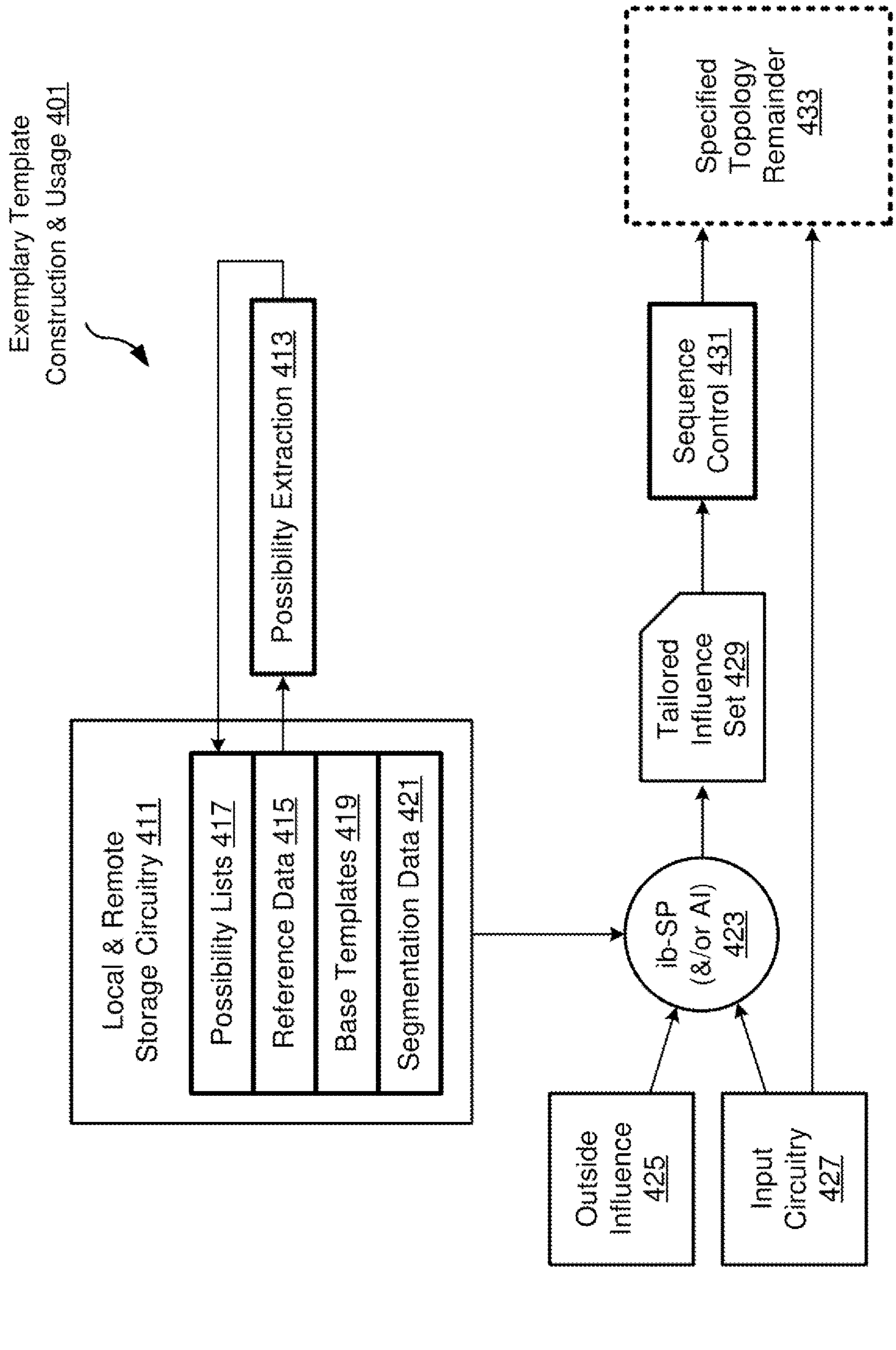
FIG. 4 is a schematic block diagram illustrating template construction and usage to support segmented operations of a multi-node topology of AI and support processing elements, employing internal cross node influence within a single segment flow of a multiple segment sequence with cross segment influence.

FIG. 4 is a schematic block diagram illustrating template construction and usage to support segmented operations of a multi-node topology of AI and support processing elements, employing internal cross node influence within a single segment flow of a multiple segment sequence with cross segment influence. In this exemplary embodiment, when some AI topologies are deployed, template sets are constructed which guide a sequence of full overall AI topology flows to carry out an overall goal. For example, one AI topology might involve generation of an illustrated novel which has a general structure involving, for example, half of the narrative carried out in text and the other half being presented with images. Both the images and the text together deliver the complete story and often times the story cannot be fully understood by just looking at the images or reading the text. Each contribute to the storytelling.

Illustrated novels also have a structure of a series of segments. Each segment involving a portion of overall story text followed by a portion of overall story images. Generative AI prepares these segments by for example delivering a first image that delivers an introduction and then follows with a first section of text to continue the story along. This first section of text then image segment by segment approach continues until an end is reached. To carry this out, the overall AI topology must maintain story context from segment to segment by extracting the story progress from a segment text and from the image as context. Along with this, stories of particular genre's often follow a theme across segments. For example, character introduction in the first segment, issue introduction in the second segment, and, following a series of segments which have their own theme goals, ends with a grand reveal theme and story closure in the final segment.

For an AI topology illustrated in this FIG. 4, the genre theme structure (segment by segment) and the story context (what has been told before) must be delivered as influence as each segment is processed. In addition, to provide variety, input influence (e.g., user input request for a thriller sci fi story), local preference influence (personal data evaluations), and prior high rated personal influence are included herein under the label of "templates" and "segment templates."

In particular, in FIG. 4, we find an influence balancing support processor, ib-SP 423 (which may alternatively be an ib-AI), that extracts for use in a tailored template set input data flow from the input circuitry 427 (e.g., a request to write a horror illustrated novel or a children's storybook). This input data flow, of course, triggers the launch of configuration of the entire topology shown. Other input data flow from the input circuitry 427 such as sensor input might reveal environmental conditions around the user device that can be used to influence the AI topology to create a much more significant impact on the user making the request.

Outside influence 425 may also influence the ib-SP 423. For example, a date may carry influence inherently such as that of Halloween night. Similarly, the ib-SP 423 may evaluate prior similar book contents that were previously generated and liked, and other private data characteristics from a local and remote storage circuitry 411 to further personalize the topology performance to best impact the user's liking of the AI topology output.

Also within the local and remote storage circuitry 411, as mentioned briefly above, the ib-SP 423 extracts a set of base templates that convey segment by segment influence data that drives the format of any illustrated novel of a horror genre. These base template sets are also pseudo random in many aspects. For example, main characters for the books may be episodic, e.g., novel two of a trilogy being written. Those characters may be added without randomness and with description tags that keep the characters consistent, maintaining a cross episode context. Alternatively, if it is standalone, the ib-SP 423 may use fully random naming to concoct characters and their descriptions for first segment introduction. Alternatively, such characters can be set forth from random selections of names and characteristics from possibility lists 417 that may fit the current naming convention for the user's location. Such possibility lists 417 can be generated by a possibility extraction 413 using user data found in reference data 415 or such lists can be created or edited manually and stored directly in the possibility lists

417. In addition, locale specific and language specific possibility lists are also available online from external sources that can be downloaded and used based on necessity.

Other random characteristics can also be extracted for other segments. For example, the type of horror being selected from a) alien, b) genetic mutation, c) paranormal, d) animal, e) murderer, etc. Segment by segment, the ib-SP 423 generates a tailored template that influences the AI topology in carrying out its overall goal. That is, the ib-SP 423 generates a tailored influence set 429 that not only conveys the user's desires to generate a multimedia output but also conveys constraint information that influences a remaining portion of this overall specified topology 433 to assist in generating quality output in a segment by segment manner via a sequence control 431.

The sequence control 431 delivers appropriate template influence and segment control on a segment by segment basis to the topology remainder 433. That is, each template of the set of templates correspond to and are used to influence a set of AI production segments, wherein in the current example a segment corresponds to a text generation plus, based thereon, an image generation production event. Other segment examples might be chapters in a novel, versus in a poem, and so on, and with each template in a set being used to influence a corresponding segment of one or more AI generated types of output.

Innumerable types of template sets are contemplated as one of ordinary skill in the art can appreciate. Comic book, short film, feature film, screenplays, music, song, lyrics, paintings, 3D (three dimensional) object outputs serving some part of overall goals of a selected topology may be combined in ways to service any variety of user or system desires, and anywhere that segmentation provides a mechanism to direct generative AI performance, template sets can be used. Several exemplary illustrations of segmented template set approaches can be found with reference to several subsequent Figures herein.

No matter what the embodiment, such template influence is directed to internally influence at least a portion of the nodes within the overall topology as represented by, for example, the topology remainder 433. Such influence may flow in circular fashion as well within the nodes delivering a segment of output. Circular fashion of influence may also flow across segments, as does a rather sequential influence that happens naturally in a chaining of one segment's output toward another as further embodiments described below illustrate.

Templates also do not require sets, such as where segmentation is not used for example where less complex goals of certain AI topologies gain little benefit. Even so, a single template can be constructed and used for a single pass influence operation that generates the full desired output, accomplishing the entire goal or purpose of the AI topology operation in one go. This might be useful in a configuration that generates a birthday greeting card with images and a tune, for example, based on a user's request provided as a textual input via the input circuitry 427.

Figure 5:
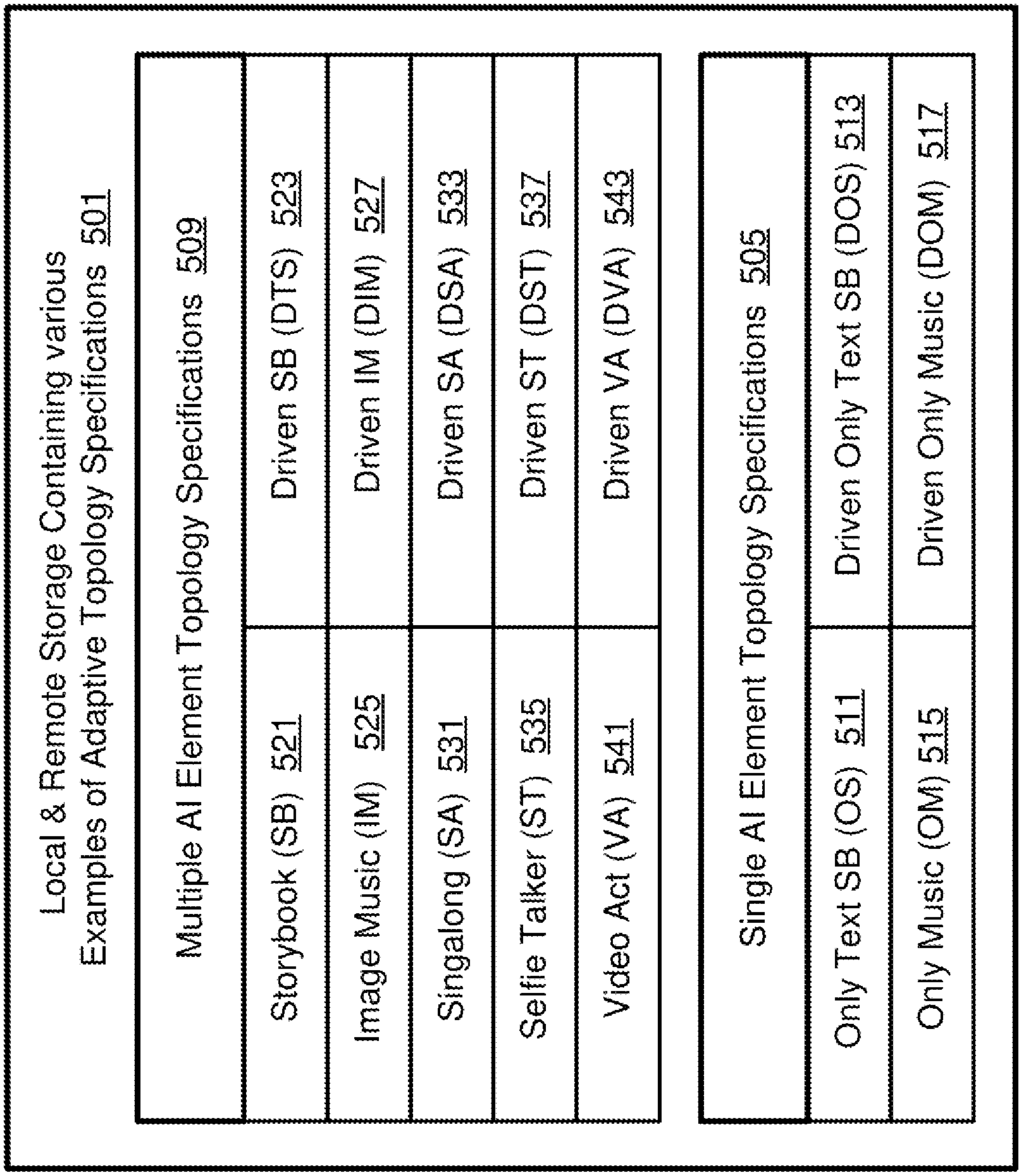
FIG. 5 is a circuit diagram illustrating an exemplary embodiment of the Adaptive Topology Specifications 165 (within the storage circuitry 103 of FIG. 1) which includes a list of available topology specifications 501 that define a plurality of overall functions useable to entertain a child.

FIG. 5 is a circuit diagram illustrating an exemplary embodiment of the Adaptive Topology Specifications 165 (within the storage circuitry 103 of FIG. 1) which includes a list of available topology specifications 501 that define a plurality of overall functions useable to entertain a child. In particular, the illustrated set of the adaptive topology specifications 501 include topologies, each involving single AI elements 505 which utilize one or more support processing elements, such as those identified in FIG. 2. Multiple AI elements are employed for each of the multiple AI element topology specifications 509, which utilize one or more support processing elements. In addition, there are base versions of topology specifications and driven versions, the latter receiving influence from user input via the input output circuitry 113 (FIG. 1).

The topologies set forth in the single AI element topology specifications 505, include, for example, an only text storybook topology 511 that generates text only stories for a child without requiring very young child to deliver input data (e.g., text) for influencing the stories produced. For older children, the only text storybook topology 511 is modified to accept such input data to influence (or drive) the storybook output. This modified topology is stored as a driven only text storybook 513. Similarly, for producing music, an only music template 515 requiring no input data influence and a counterpart, a driven only music template 517, responds to user input influence. Also, a preset schedule may act as a trigger drive the generation of content that can entertain a child or an adult. At a particular time on a particular day or all weekdays, a trigger can be defined to arise and cause such generation.

Multiple AI element topologies 509 include a storybook topology 521 and its user input influencing counterpart, a driven storybook topology 523, produce a storybook made up of a generated image and corresponding descriptive text in a page segment by page segment manner. An image music topology 525 and counterpart, a driven image music topology 527, present a page segmented image and corresponding music generations that change each time a child turns pages. Such generation might be interactive generation in a live entertainment style of user experience. Both a singalong topology 531 and a driven singalong topology 533, when in operation generate and deliver music and singing output, including lyrics for the child to join in and follow. A selfie talker topography 535 and driven selfie talker topology 537 generate and deliver in response to a captured selfie (on for example a smartphone or tablet), text, corresponding voice, and a video simulating the person captured in the selfie as talking to the child. In the driven selfie talker topology 537, the child's input may be used as a question that influences output of an answer that simulates the person in the selfie in video form conducting a conversation with the child as if the simulated output was actually a live video call. For a last example of any number of possible topologies for children, a child may request a short video generation with or without child influencing input, i.e., via a video act topology 541 or a driven video act topology 543.

There are many ways to carry out these functionalities or goals set forth within each of the adaptive topology specifications 501. For example, text output may be generated before generating an image that is based on such output text. Alternatively, an image output may be generated which is used to influence a generated text output. In other words, the order of AI elements can be shuffled into different orders and influence interconnections therebetween can vary dramatically. Even the particular AI elements and support processing elements can be altered to service different topology structures that still deliver the overall functional goal sought by the child. After reviewing the teachings of this specification, those of ordinary skill in the art will appreciate this and understand that the specific examples that follow are only one of many topologies to achieve the aforementioned functional goals. Also, as before, these topologies can be defined to run only locally in for example a child's tablet device. They can also operate with topologies with all or most all nodes existing in cloud based elements.

Figure 6:
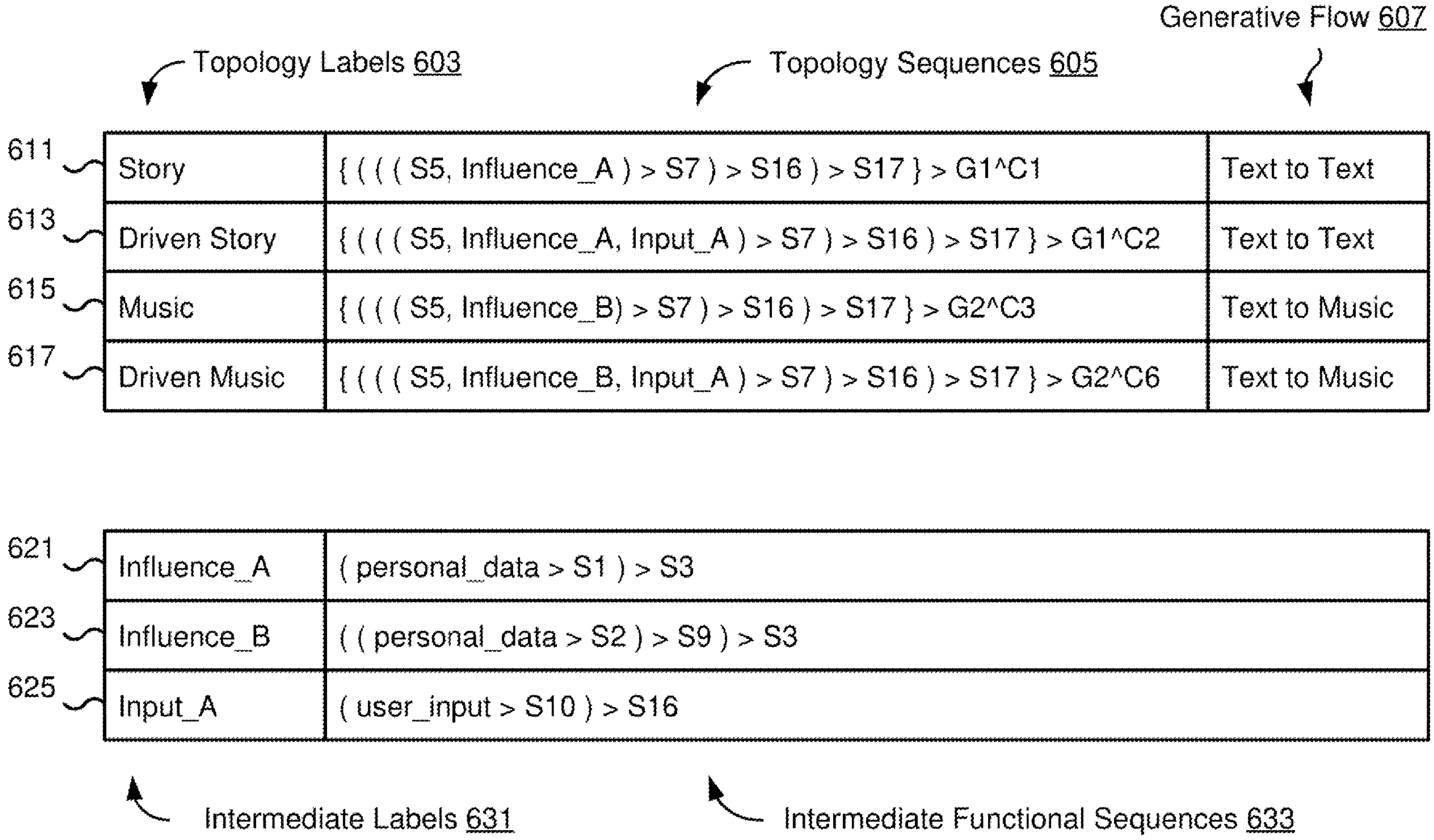
FIG. 6 is a diagram that illustrates a number of possible topology specifications for carrying out the functionality identified in some of the topologies set forth in FIG. 5.

FIG. 6 is a diagram that illustrates a number of possible topology specifications for carrying out the functionality identified in some of the topologies set forth in FIG. 5. In particular, FIG. 6 provides exemplary detailed examples, with reference to FIG. 5, of the storybook topology 521, the driven storybook topology 521, the image music topology 525, and the driven image music topology 527.

For example, within an adaptive topology specification database, database fields such as a topology label 603, topology sequence 605 and generative flow 607 define an abbreviated structure through which overall topologies are defined. As illustrated, a story label 611 defines an overall function wherein a pseudo-random template abbreviated as a code S5 (with reference to FIG. 2) is used as a first influence input along with second influence input extracted from personal data. The personal data is used to personalize stories in a way that interests the child, for example, by identifying pet names and descriptions from local text and image data on a child's tablet for use in story text generation.

The personal data requires several steps of support processing before its influence text is in a condition that can be easily combined with the pseudo-random template text. Both influence feeds, i.e., the template influence text and the personal data based influence text, are placed into a common format and combined by the S7: influence merger 241 support processing (FIG. 2). This merger may involve weighting preference or otherwise known herein as influence balancing performed by the S7: influence merger 241 support processing (FIG. 2). Specifically, influence text from a template may be prioritized and establish the baseline output of the merger with only the most important text from the personal data extract being added to the merged output. If instead, the personal data is to be prioritized, the merger may use it for the baseline text with only the very most important and unique elements of the template being added especially when in even slight conflict with the personal data extraction text so as to ensure the generated output will be influenced as desired.

The template itself is constructed directly into a desired format for easy combination by the S5: pseudo-random template 233 support processing (FIG. 1), but the personal data requires support preprocessing to reach the desired format. For example, as illustrated by database entry 621, the personal data extracts receive the S1: reduce repeats 221 and S3 feature extract 225 support processing steps identified in FIG. 2. This Influence_A and the template influence represented by code S5 are merged by code S7 (influence merger) before receiving a variety so support processing in advance of being delivered as a combined influence into a first generative AI element identified as code G1 that operates according to a training configuration identified as code C1. In sum, a text only children's story output is fully generated without segmentation by a single AI element, with the generation being influenced based on merged template text and personal data extract text.

Similarly, a topology for a driven text only story is set forth in database entry 613 with support again from the database entry 625 and the database entry 621. The only change being that user input is added as further influence. In the database entry 625, the user input is preprocessed according to code S9 (the denoise support processing 245 of FIG. 2 to correct spelling and remove unrecognizable text) followed by code S14 (the lemmatization 263 of FIG. 2 to identify and extract only the most important of the user's input text for merger). As a result of such preprocessing, the user input is readied for easy combination as Input_A into the topology defined within the database entry 613. Therein, the defined topology is the same as that of the database entry 611, except that the Input_A user input influence is combined along with the personal data based Influence_A and the template influence represented by S5. Again, code S7 (the influence merger support processing 231 of FIG. 2) may operate treating all three influence text flows the same with a mere appending all text influence into one combined text, or weighting or bias can be applied where for example, the user's input text has a highest priority and the other influence flows have less important text removed. Whether with influence or without, the combined, merged single text output is further support processed and finally delivered to the first AI element (G1) operating in accordance with a second configuration (C2) to deliver the story output for presentation to the child.

Similar topology functionality is defined in a specification for generating and delivering only music for the child's enjoyment. This can be without a child's input text influence, as set forth in database entry 615, or with such input text influence as in database entry 617. The main difference between the two topologies can be found in the influence used for merger. The database entry 615 involves template influence text being combined only with personal data extract influence text (as identified in database entry 623). The database entry 617 sets for that in addition to those two influence texts, a child's input text (user input) is preprocessed as Influence_B and added to the influence text merger as conducted again by code S7 (the influence merger support processing 231 of FIG. 2). Such merger support processing may deliver heightened priority during the merger to any of the sources of influence text over the others. In all of the database entries 611, 613, 615 and 617 utilize ">" as an operator indicating symbol, and all of the codes identified are set forth in detail in FIG. 2 and related textual description herein.

Shorthand codes such as G1 and G2 represent different versions of AI elements which are trained to operate in a particular way as defined by any one of shorthand code configurations C1 to CN. The input output flow, or the generative flow 607, describes the input to the output flow data types. For example, the database entries 611 and 613 utilize G1, a text input to generated text output AI element. Similarly, database entries 615 and 617 define topologies which utilize G2, which is configured and trained to respond to text input and generated music output.

If the AI element comprises for example a neural network circuit, perhaps in an analog designed layout, C1 to CN might also be shareable configurations from specific trainings that can be swapped in and out. G1 and G2 may, if both are such circuits, have different array sizes and other different characteristics that dedicate them to certain types of functions like text to music generation versus text to text generation and so on. Also, if G1 comprises a purely software AI model, C1 through CN corresponds to accelerator configurations for accelerator circuits such as the accelerator circuit units 107. No matter which type of configuration C1 through CN represent, they can be readied for quick swapping via circuit structures such as the quick swaps 115 and 117 of FIG. 1.

Also note that each database entry details either overall topology sequences 605 with topology labels 603 or intermediate functional sequences 633 with intermediate labels 631. Overall topology sequences 605 utilize intermediate functional sequences 633 most often when such intermediate functional sequences 633 can be stored for reuse in other unrelated topology specifications to avoid unnecessary reprocessing burdens. These functional sequences can be selectively shared with other users or devices, including with or without authorization restrictions, compensation requirements, watermarking, and other digital rights management constraints.

FIG. 7 is a diagram illustrating a number of further exemplary topology specifications for carrying out some other functions identified in the topologies set forth in FIG. 5. Therein, several of these topology specifications can be found within a memory storage 701. Particularly, topologies that generate a storybook 731, directed storybook 733, image music 735 and directed image music 737 each define one of many ways to reach a desired overall generative output goal or purpose.

The storybook 731 uses the topology specification of the story 611 from FIG. 6, which generates story text using personal data and template based influence. Based on this generated story text, the storybook 731 also generates images. This text and image generation example is handled in a segment by segment flow. For example, a generated story text segment influences a single image generation and both the generated store text segment and the generated image are delivered for a visual presentation on a child's device as a first page of a storybook. In addition, such generated story text and image provide influence for the generation of the next segment of story text and image. One after another, pairs of text and image are presented as storybook pages to a child in response to their interactions through user input circuitry and elements to turn the page.

Pre-influence 711 topology portion involves processing of a generated story text to be used to influence a subsequent image generation for the current segment. Each of the codes illustrated (e.g., S14, S10, S16 and S3) correspond to support processing functionality described in relation to FIG. 2 and applied in a sequence corresponding to the ">" symbol. For example, S14 is applied to the prior story text segment first and then S10 support processing. S16 follows and finally S3 support processing is applied. Although illustrated in sequence, a single combinational support processing function into a single unit with parallel application can be used, and, thus, the illustrated sequence is but one option.

This pre-influence 711 received further support processing as illustrated to generate a combined Influence_C. That is, along with the generated text segment influence, template influence is also combined. Such template, as mentioned herein being one template in a set of templates that are configured for each segment being processed. A first segment and a last segment in the story, for example, having substantial differences as first segment (or page in this embodiment) of a storybook have a different characteristic than the last segment (or page) of a storybook as there is a common flow from introduction toward closure with each segment along the way benefiting from a changing template influence that helps direct a quality output.

In particular, in accordance with the topology portion of the Influence_C 713, the pre-influence and template influence (e.g., code S5—see FIG. 2) are combined into a single influence flow by support processing S7 (see also FIG. 2). Thereafter, in sequence, support processing S16 and S17 (FIG. 2) are applied to ready that single influence flow for delivery to a text to image generating AI element labelled G3 which is configured via an indication C5 (G3^C5) within the topology of the storybook 731. The code C5 corresponds to either neural network configuration data or accelerator configuration data depending on whether the AI element G3 is a neural network based circuit unit or a software AI model that uses acceleration. Whichever is used depends as mentioned herein whether it G3 AI element is running remotely or locally, whether circuit resources are available remotely or locally, and so on.

The overall topology described in relation to the storybook 731 topology describes production of a single page (i.e., a single segment) of a child's storybook. Further segment production, although not shown, continue this process but with influence from both the prior segment's text and image being used to influence subsequent segments' text and images. For example, an image style and content needs to be consistent across an entire storybook. This may be constraints placed in the training of the generative AI element G3^C5 itself. In this way, only a single particular style might be trained in and thus generated. Even so, image content needs to continue forward segment by segment so as to not lose context or confuse the child reader. Also, G3 can be trained to generate images in multiple image or painting styles such as watercolor, pencil sketch, famous painter's style, etc. Such style data should be maintained across images, again to not confuse the reader.

To accomplish this carrying forth style and content detail influence, G3 is trained not only to generate an image, but to provide a coded output that identifies the style employed along with content details. For example, AI element G3's first image output illustrates a dog generated with influence from the first segment of generated story text about a dog. In addition to the first image output, the AI element G3 also outputs both content and style information (herein "context data"). Here, the style might identify pointillism, color palette information and any other information that will constrain generation of future images for upcoming segments of the book. Similarly, characteristics of the dog, such as coloration, relative size and breed are conveyed in the output. Such context data is then used to influence subsequent image generations, with each new image generating its own such influence output whenever new image elements or characteristics emerge in the sequence.

Alternatively, if AI element G3 is not trained to provide the context data, a supporting AI element can be so trained in response to receiving the image generated by the AI element G3. Similarly, many other variations of such topology to carry out such a single overall function is contemplated. The storybook 731 topology, for example, may be carried out by starting first with image generation output which delivers as influence the image output as input to an AI element that generates a text segment output in response thereto in an image to text manner. Influence can also flow in cycles to refine and correlate a text and image segment pair. For example, from generating text which is used to influence an image generation which, in turn, is used to feed back to influence a regeneration of the original text. This circular influence can continue with the newly generated text output being used to influence the regeneration of the original image. The cycle can be broken in many ways per topology design. For example, controlling the number of cycles by fixed limit such as a single loop or multiple loops, wherein the cycling always occurs and always a fixed number of times, wherein the number of times is selected as it is known through testing to achieve an acceptable correlation between the text and image segment. The reason for this is for example a story about a boy in text may influence generation of a sketch of the boy and a dog (unmentioned in the generated story text) so regenerating the story text and the boy and dog are mentioned in the second pass of the text generation and so on. Instead of a fixed number, a discriminative AI element may evaluate the important nouns and verbs associated with the story text output and image output's associated text description and conclude that another cycle is needed or not. Similarly, the fixed maximum number of cycles can also be integrated with the discriminative AI element approach, wherein sufficient correlation between the image and story text segment ends up being reached before the maximum cycles occur, terminating the cycling early.

Such cycling is employed between segments as well. For example, there needs to be a certain amount of correlation between a first segment's pair of story text and image with that of subsequent sets. For example, when a subsequent story text segment or image segment doesn't correlate well with a prior story text or image segment, influence may need to be amplified and the subsequent story text or image can be regenerated until an acceptable correlation level is established. If the storybook is being generated fully before presentation to the child in a page by page turning manner, a prior segment of text and image can alternatively or also regeneration so that it conforms with subsequent one or more text and image segments. And as before, this can be using a fixed number of cycles, a conformance discriminating AI element, or both as defined by the overall topology specification.

In addition, selective reuse of previously generated images is also supported for use by the current user as well as for reuse through deliver of the generated images to other users who may not have access to such underlying AI topology generating capabilities. Such third party user sharing may also support saving of processing power or battery usage and allows for multiple user ratings that identify best generated output that is not so common even from a particular generating topology might find highest success output ratings by a user less than 50% of the time, for example. By sharing, many human users can weigh in and identify those generated outputs that fall into the highest category, and future use of shared high ranking output can then often be more satisfying than a user's self-generation. Of course, sharing requires proper use of authorization, payment and other digital rights management constraints applied.

For this reason, sharing and receiving many humans rating of generated AI output is not merely useful for selecting a substitute to be presented to a user instead of engaging a user's AI topology generation to create something new. Such ranked generations of AI output can then be collected along with the original trigger event input (such as user text request, environment data, and so on), to train or fine tune an AI element that will more likely produce better output than that counterpart in the original AI topology that created such works. In other words, using high quality outputs generated by AI in response to input queries and such, that is by using the input and output pairs of quality, different AI training can take place and even an entirely new topology may be based thereon with a much higher chance of producing best new generated by AI output than that of the original. One approach that is contemplated is to start with raw data filtered and support processed to train a first AI element. Then, over time and from multiple user interactions with the first element, gather all of the input output pairs and user ratings associated with the first AI element to train a second AI element. Thereafter, only the second AI element could be used. In an alternative approach, the first AI element which usually has a massive training set interacts with the first AI element in a topology that has a higher likelihood of success for servicing common input (using the second AI element) and a higher likelihood of success for servicing uncommon input (using the first AI element). And where periodically, the input output pairs of the first AI element is trained into the second AI element and vice versa.

The topologies of the directed storybook 733, image music 735 and directed image music 737 operate similarly in that they illustrate at least a portion of the overall topology for carrying out at least a segment of an overall output. Details such as influence cycling and training (also carried out according to topology specifications) are not illustrated, but are present and contemplated as described above and herein. Those skilled in the art will realize that the purpose of the absence of such functional details in this FIG. 7 (and many others) are being done to accommodate the constraining limitations of the physical drawing size. Only so much detail can be provided on a single sheet of drawings. Attempting to add as much detail in the limited space also underlies the use of coding symbols, such as those representing support processing and AI elements. All described functionality and aspects of the present invention described within this specification are contemplated to be defined within the various topology specifications illustrated whether or not they are specifically called out in any of the exemplary set of drawings.

Regarding the topology of the directed storybook 733, the topology is nearly identical as that described in relation to the storybook 731 topology. The exception being the use of user input influence (Input_A 625 of FIG. 6). Such influence is integrated into a single influence flow along with template and story text output influences as illustrated in an Influence_D 715 topology subpart of the overall topology, the directed storybook 733, within the database of topology specifications. The difference then between the directed storybook 733 and the storybook 731 involves whether or not a child provides user input. A "tell me a story" button touched on a smartphone would trigger a pseudo-random story (e.g., pseudo-random template influence impact), while a text input field "tell me a story about a princess" typed in by a child, would deliver a different pseudo-random story but with princess being present. The single button approach triggering the storybook 731 topology specification launch, while the text input field triggers the directed storybook 733 topology specification launch.

The image music 735 and the directed image music 733 specifications are similarly related. The only difference between the two being whether the child triggers using a quick button press or by typing in a request that identifies desired influence restrictions used to further influence subsequent image generation. In particular, the overall functionality sought is to deliver an image or sequence of images (in segments along with music), wherein music is generated that has an emotional correspondence to an image. Music may also be accompanied by sounds like rainfall in the background or lightning or dog barking, as seems appropriate based on the image content.

For example, a child's certain button-press triggers a single pseudo-random image and influenced music output via a defined topology specification with the topology specifications 701, i.e., the image music 735 topology specification. The image music 735 topology calls for "Random_imageA++Music_OutA" which corresponds to a sequence of producing first an image output and then using it to produce an associated, related piece of music.

Specifically, in the first step, the partial topology Random_imageA 717 involves generating a pseudo-random image through a pseudo-random template S5 that influences an AI element G4 with configuration C6. Constraints on the output image can be fully carried in the template and supporting processing S5, as shown. Alternatively, much of the constraints and corresponding constraining influence can be carried not fully or at all within the template support processing but within the AI element G4 itself via training.

This is done for example via the training set by only including training data that prevents AI element G4 from exceeding some bounds such as avoiding adult content in kid's image output. For example, only training AI element G4 with acceptable images fit for a children's book. If, however, the AI element G4 is trained to generate both kid-friendly and adult image output, the template generated by associated support processing S5 must not only contain pseudo-randomness and general content influence, but must also deliver influence to attempt to constrain the AI element G4 to generating kid-friendly output. In this case, the constraints may take the form of adding text input such as "for a toddler" and so on.

In addition, further support processing can be added before and after an image is generated that will recognize any image that exceeds a child-friendly bounds, and require regeneration of the image by the AI element G4 in a cycling influence manner as mentioned previously herein until a child-friendly image is converged upon.

Once the AI element G4 delivers an (acceptable) image output, as Random_imageA 717, such output is routed both to deliver a visual presentation for the child and to influence music output generation by the image to music (with integrated background sounds) AI element G6 as illustrated by the Music_OutA 721—a subpart in the overall topology. In this way, both an image and music (along with sound effects) can be generated for a child upon a simple button request trigger which launches the image music 735 topology.

Although not illustrated, cycling of influence and regeneration of either or both the image and the music is contemplated as described herein to reach a tight coupling of the image and music pairing. For example, the AI element G6 might introduce a wolf howl into the background of the music. This howl can then cause via influence a rerun of the AI element G4 to add in a distant wolf and moon backdrop in a replacement image, for example, and all due to influence feedback and a cycling rerun.

As mentioned, the directed image music 737 topology operates the same as the image music 735 topology except that user input is used to influence the image generation. Specifically, the partial topology set forth in a Random_imageB 719 involves using influence from not only a template (via support processing S5—see also FIG. 2) but also from user input as gathered from a partial topology described in FIG. 6 as Input_A 625. Otherwise, the overall topology specification is the same as that of the image music topology 735.

FIG. 8 is a diagram that illustrates a further number of possible topology specifications for carrying out the yet other functionality identified in several of the topologies identified in FIG. 5. Therein, exemplary topology specifications for a singalong 831, directed singalong 833, selfie talker 835 and directed selfie talker 837 can be found. As an overview, these exemplary singalong topology specifications define an overall functionality wherein a child can generate lyrics which drive music output in a visual and audible singalong with bouncing ball over lyrical word type visual output as the music plays along on que. Likewise, the exemplary selfie talker topology specifications illustrated also define an overall functionality for presentation to a child. The child takes a selfie photo or a photo of a family member with a tablet or smartphone device, for example, and these topology specifications generate video output produced based thereon.

In particular, the exemplary topology of the singalong 831 involves "LyricsA++MusicA." The partial topology Lyrics A 811 identifies that the topology of Influence_A 621 of FIG. 6 is being used. This can merely be for reference and all of the Influence_A 621 topology may be carried out again, or the underlying output can be merely stored for reuse across various overall topologies. Either way, personal data stored either or both locally and remotely corresponding to the child is prepared to influence the generation of lyrics by an AI element G1 as configured according to C3. As mentioned previously, such G1^C3 combination (called out in the partial topology of LyricsA 811) uses input influence (Influence_A 621 of FIG. 2) to generate such lyrics. Such G1^C3 combination can involve a full software AI model, a software AI model that uses C3 type accelerator configuration data, or a neural network based circuit using a C3 training configuration and can be remote or locally operable and support real time switchovers between local and remote operations with even the type of G1^C3 differing depending on its location.

LyricsA 811 is delivered for both: a) user presentation as set forth in the singalong topology 832; and b) is used to influence a second AI element G2^C5 which produces sheet music with underlying musical notes as an intermediate influence output that influences yet a third AI element G8^C1 which generates from influence notes input (sheet music format) musical output. Although lyrics and music are presented for a young child, full sheet music output such as that produced by the second AI element G2^C5 combined with the lyrics from the first AI element G1^C3 could be delivered for those musically trained. Similarly, the directed singalong 833 topology utilizing Lyrics B 813 produces the same overall output functionality, but with the child's text input used for influence as can be seen in LyricsB 813, wherein Influence_B 623 and Input_A 625 both of FIG. 6 are merged into a single influence flow delivered to generative AI element G1^C3 to produce the Lyrics B 813.

The selfie talker 835 topology specification defines operations of "Subtitle_A++Video_A" which are sub-defined in a partial topology Subtitle_A 819 which is performed first as the "++" symbols indicate and followed by the partial topology Video_A 823. The Subtitle_A 819 calls for a first AI element G1^C4 to generate video subtitles from influence text involving template support processing S5 influence, user input influence (i.e., Input_A 625 of FIG. 6), and personal data influence (i.e., Influence_A 621 of FIG. 6), wherein the support processing S7 (see FIG. 2) merges these three influence sources, with or without weighting preferences as specified within the support processing S7 configuration.

The Video_A 823 is then generated (in response to and in accordance with the influence from Subtitle_A 819 and the user's selfie) by the AI element G9^C2 which responds to subtitles and a selfie image by generating a video that simulates a video capture of the person in the selfie talking in their own or an amusing other voice. AI element G9^C2 in this case may be a single software or hardware (or combination thereof) unit, or it may involve multiple units that surrounds this overall AI element G9^C2 functionality. For example, a separate AI unit might generate from the Subtitle_A 819 text, the voice output and another separate AI unit might receive either or both of the voice output and the Subtitle_A 819 text to modify the mouth area on the selfie image in an animated manner to simulate the speech visuals. Together, these separate units act as a single AI element G9^C2. If these two separate units are often used separately, they may be broken out as two AI elements and, in such a case, G9ˆC2 might instead be identified as G10 and G11 with corresponding topology changes. In other words, if an AI element with multiple underlying units always operates as one group, they can be referred to as an AI element and that includes any associated internal support processing as well. Any AI element that has multiple units that often operate independently and not as a group should be identified as multiple separate AI elements. Even so, this nomenclature is only a guide. For example, one AI unit may find home along with multiple other AI units and support processing all within a first AI element, and also be defined to fall within a second AI element in either a different multiple AI unit grouping or in a stand-alone mode.

As before, the topology of the directed selfie talker 837 differs from that of the selfie talker 835 only in including the child's text input as influence. As can be seen in Subtitle_B 821 topology, in addition to template (S5) and personal data (Influence_A 621 FIG. 6) influences, Input_A 625 (FIG. 6) delivers a third source of influence that is merged together with weighting to cause AI element G1ˆC1 to deliver the Subtitle_B 821 text to be used for the video generation.

FIG. 9 is a diagram illustrating a set of exemplary topology specifications for carrying out the remaining functionality identified in a corresponding remaining set of the topologies set forth in FIG. 5. Therein, two exemplary approaches defined by the topologies video act 911 and directed video act 913 generate a video output for a child to watch. This can be with subtitles and with or without the child delivering user input to influence the video generation, i.e., via the directed video act 913 or the video act 911 correspondingly. The difference between the two involving whether or not the Input_A 625 (FIG. 6) is included as influence in the influence merger.

As per a C4 training configuration, AI element G1 receives merged input influence and delivers a full screenplay text using the topology screenplay_A 915 (or screenplay_B 917 if user input influence is to be included). This screenplay includes various characters selected at random from collections of the child's private data and a plurality of selfies and photos captured for future or ongoing video generation. For example, the child may select the actors to be included from a pre-captured set of images with name associations stored in local personal memory. The child may alternatively or in addition take snapshots on the fly for inclusion. By adding text, such as "give me a movie with superman, me and my dog in it" this and other user text is included to influence the selection of actors, their roles and even genres via the directed video act 913. Otherwise, video act 903 proceeds with random selections from personal storage and public data with either or both stored local or remotely.

From the selection of actors, a screenplay text is generated pursuant to the topology of the screenplay_A 915 (or the screenplay_B 917). Thereafter, the screenplay text is used to influence the production of the video by AI element G6 operating pursuant to a C2 training configuration. The AI element G6 uses the screenplay to extract images of actors, select backgrounds, add in props, generate voice, and animate the actor images to deliver a video output, as set forth in the topology Video_OutA 919 (or Video_OutB 921). As before the AI element G6 may be a single AI unit comprising a single neural network element or it may comprise a number of AI units along with internal support processing. G6ˆC2 could also be defined as a plurality of AI elements such as many separate AI elements such as those that generate voice from text, animated mouths from voice, and background images from text.

For a child, a cartoon format is also contemplated wherein a separate AI unit functionality transforms selfies and photographed humans into a cartoon representation, and the video generated being a cartoon. Realistic counterparts of course are also contemplated for children or adults.

In addition, although throughout this specification selected exemplary embodiments have been used to illustrate particular aspects of the present invention, all of these aspects are contemplated as being combinable into a single embodiment or extracted into any subset of such aspects into enumerable other embodiments. Thus, the boundaries of each embodiment regarding particular aspects included therein are merely for illustrating operation of a select group of aspects and are in no way considered to limit the overall breadth of such aspects or the ability of combining them as so desired and as one of ordinary skill in the art can surely contemplate after receiving the teachings herein.

For example, in some configurations of an electronic infrastructure with a memory and processing, the memory (e.g., at least a portion of the storage circuitry 103 of FIG. 1) stores a first artificial intelligence topology portion and a second artificial intelligence topology portion. The first artificial intelligence topology portion and the second artificial intelligence topology both configured to deliver a first output. Processing circuitry operates to switch between the first artificial intelligence topology portion and the second artificial intelligence topology portion in the delivery of the first output.

In another configuration of an electronic infrastructure, a memory stores a plurality of topology specifications. Each of the plurality of topology specifications include a plurality of artificial intelligence nodes. Also therein, circuitry operates in response to a first selection to participate in carrying out at least a portion of functionality defined within the plurality of topology specifications.

Another electronic infrastructure includes processing circuitry and a plurality of influence data originating from a corresponding plurality of data sources. The processing circuitry performs influence balancing and merger operations on the plurality of influence data to produce combined influence data destined to influence an operational neural network.

Within another configuration, artificial intelligence circuit infrastructure includes both storage circuitry and processing circuitry. The storage circuitry stores at least one specification of an artificial intelligence based topology that includes a plurality of topology nodes and associated interconnections. The processing circuitry adapts such artificial intelligence based topology based on at least one user device characteristic.

The artificial intelligence circuit infrastructure of a similar configuration also includes both storage circuitry and processing circuitry. Here, the storage circuitry also stores a specification of an artificial intelligence based topology that includes a plurality of topology nodes and associated interconnections. The processing circuitry adapts the artificial intelligence based topology though based on at least one characteristic of a user.

In yet another configuration of an artificial intelligence infrastructure, an artificial intelligence topology can be found. Such artificial intelligence topology is configured to include a plurality of topology nodes and associated interconnections that carry out an overall generative process. In addition, a first element (outside of the plurality of topology nodes) is configured to inject influence into the artificial intelligence topology in response to an occurrence of a first event that occurs during the overall generative process.

Another artificial intelligence infrastructure includes both first and second artificial intelligence based elements. Therein, the first artificial intelligence based element delivers a first output for a first purpose within segments. Similarly, the second artificial intelligence based element delivers a second output for a second purpose in within segments. Both the first and the second artificial intelligence based elements take turns generating segments of the first output and the second output to accommodate at least one of internal segment influence and cross segment influence.

In another configuration of artificial intelligence infrastructure, an artificial intelligence based topology generates, using a segment by segment approach, a plurality of generated segment output. Therein, a plurality of templates are each configured to influence the generation of a corresponding one of the plurality of generated segment output.

An artificial intelligence infrastructure according to another configuration includes an artificial intelligence based topology, memory and processing circuitry. Therein, the artificial intelligence based topology generates at least a first output. The memory stores a plurality of processed influence possibilities, while the processing circuitry randomly select at least one of the plurality of influence possibilities for use in influencing the generation of the first output.

In another configuration of the artificial intelligence infrastructure, a user device is supported, and wherein a first option neural network based element is configured within the user device to produce a first output of a first media type for a first purpose in response to a first input. A second option neural network based element is configured to produce a second output of the first media type for the first purpose in response to the first input. Also, an assisting element is also configured select from the first option neural network based element and the second option neural network based element to produce the first input, wherein the selection being based at least in part on likelihood of achieving user satisfaction.

In yet another artificial intelligence infrastructure configuration, a remote artificial intelligence element is configured to respond by generating a specific type of output with an at least somewhat predictable first characteristic. The local artificial intelligence element is configured to respond by generating the specific type of output with an at least somewhat predictable second characteristic. Therein, an assisting element configured to choose between the local artificial intelligence element and the remote artificial intelligence element for the generation of the specific type of output based at least in part on at least one of the first characteristic and the second characteristic.

Other configurations find an artificial intelligence infrastructures that support both a first and a second user by employing storage circuitry along with processing circuitry that is capable of performing at least a portion of an artificial intelligence based generation of a first output of first type for the first user. The storage circuitry stores a second output of the first type generated previously for the second user. Therein, the processing circuitry delivers to the first user a selected one of the first output or the second output, the first output requiring the performance of the at least the portion of the artificial intelligence based generation. This selection being based on at least one current characteristic associated with the artificial intelligence based generation.

In yet another configuration of an artificial intelligence circuit infrastructure, circuitry operates by performing both first node functionality based on a first neural network that generates a first output and second node functionality based on a second neural network that generates a second output. The circuitry being operable to perform both the first node functionality by utilizing the second output to influence the first neural network, and the second node functionality by utilizing the first output to influence the second neural network.

Another artificial intelligence infrastructure is configured with an output organizer along with a first node and second node. The first node being configured with a first neural network, and having a first input and a first generated output that is delivered to the output organizer. The second node is also configured with a second neural network, and itself having a second input and a second output that is delivered to the output organizer. In addition, the second output is used to influence the first node via the first input.

Another configuration finds the artificial intelligence infrastructure fitted with a first neural network node configured to produce a first output. Also therein, a second neural network node configured to produce a second output used to influence the first neural network node with an adjusted influence weighting. In a somewhat similar configuration with first, second and supporting neural network nodes, another an artificial intelligence infrastructure can be found. Therein, the supporting node responds to first data generated by the first neural network node by producing, from at least the first data, second data that is used to influence the first neural network node.

In another configuration, an artificial intelligence infrastructure includes a support processing node being configured to apply influence balancing to a plurality of data inputs to produce combined influence data. Also included is an artificial intelligence node being configured to receive as input the combined influence data that influences output generation.

Another artificial intelligence infrastructure, according to another configuration, includes a first and second neural network nodes and an assisting node arrangement. The first neural network node configured to produce a first output of a first media type, while the second neural network node configured to produce a second output of a second media type. Therein, the first media type being different the second media type. The assisting node being configured to produce, based on the second output, influence data that is applied to influence the first neural network node.

According to another configuration of the artificial intelligence infrastructure which supports a user device, a first option neural network based element is configured within the user device to produce a first output of a first media type for a first purpose in response to a first input. A second option neural network based element is configured to produce a second output of the first media type for the first purpose in response to the first input. Therein, an assisting element configured select from the first option neural network based element and the second option neural network based element to produce the first input, wherein the selection being based at least in part on likelihood of achieving user satisfaction.

An artificial intelligence infrastructure in another configuration includes a remote artificial intelligence element configured to respond by generating a specific type of output with an at least somewhat predictable first characteristic. It also includes a local artificial intelligence element configured to respond by generating the specific type of output with an at least somewhat predictable second characteristic. Therein, an assisting element configured to choose between the local artificial intelligence element and the remote artificial intelligence element for the generation of the specific type of output based at least in part on at least one of the first characteristic and the second characteristic.

Those of ordinary skill in the art, after having reviewed the present application, shall realize that there are a vast number of additional and contemplated configurations beyond those mentioned above. Moreover, for each of the enumerated examples and configurations identified, there are numerous refinements based on yet other aspects of the present invention that may be integrated therein.

The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description, and can be apportioned and ordered in different ways in other embodiments within the scope of the teachings herein. Alternate boundaries and sequences can be defined so long as certain specified functions and relationships are appropriately performed/present. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block/step boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof. Although the Internet is taught herein, the Internet may be configured in one of many different manners, may contain many different types of equipment in different configurations, and may be replaced or augmented with any network or communication protocol of any kind.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An artificial intelligence infrastructure supporting a first user and a second user, the artificial intelligence infrastructure comprising:

processing circuitry configured with a capability of performing at least a portion of an artificial intelligence based generation of a first output of first type for the first user;

storage circuitry operable to store a second output of the first type generated previously for the second user; and the processing circuitry being operable to deliver to the first user a selected one of the first output or the second output, the first output requiring the performing of the at least the portion of the artificial intelligence based generation, wherein the selection is based on at least one current characteristic associated with the artificial intelligence based generation.

2. The artificial intelligence infrastructure of claim 1, wherein:

the processing circuitry is operable to disregard a specific influence according to the at least one current characteristic.

3. The artificial intelligence infrastructure of claim 1, wherein:

the processing circuitry is operable to determine a user class, for the first user and the second user, according to one or more of age, gender, location, profession and historical ratings.

4. The artificial intelligence infrastructure of claim 1, wherein:

the processing circuitry is operable to:

process influence inputs from one or more of personal data, remote sources and current events, and adjust an impact of the influence inputs according to a preference of the first user or the second user.

5. The artificial intelligence infrastructure of claim 1, wherein:

the processing circuitry is operable to using influence balancing to block, accept, reduce or heighten influence contributions from multiple sources.

6. The artificial intelligence infrastructure of claim 1, wherein:

the processing circuitry is operable to balance influence by blocking or adding sources and adjusting weights for different user classes.

7. The artificial intelligence infrastructure of claim 1, wherein:

the processing circuitry is operable to perform adaptive merger support processing to tune influence weighting to the first user and the second user.

8. An artificial intelligence infrastructure supporting a user device comprising a processing circuitry, the artificial intelligence infrastructure comprising:

a first option neural network based element configured within the user device to produce a first output of a first media type for a first purpose in response to a first input;

a second option neural network based element configured to produce a second output of the first media type for the first purpose in response to the first input; and an assisting element configured to select between the first option neural network based element and the second option neural network based element to process the first input and produce an output of the first media type for the first purpose, wherein the selection is based at least in part on a predicted likelihood of achieving user satisfaction with the output produced by the selected neural network based element.

9. The artificial intelligence infrastructure of claim 8, wherein:

the assisting element is operable to disregard a specific influence according to at least one characteristic.

10. The artificial intelligence infrastructure of claim 8, wherein:

the assisting element is operable to determine a user class according to one or more of age, gender, location, profession and historical ratings.

11. The artificial intelligence infrastructure of claim 8, wherein:

the assisting element is operable to:

process influence inputs from one or more of personal data, remote sources and current events, and adjust an impact of the influence inputs according to a user preference.

12. The artificial intelligence infrastructure of claim 8, wherein:

the assisting element is operable to using influence balancing with the first option neural network and the second option neural network to block, accept, reduce or heighten influence contributions from multiple sources.

13. The artificial intelligence infrastructure of claim 8, wherein:

the assisting element is operable to balance influence by blocking or adding sources and adjusting weights for different user classes.

14. The artificial intelligence infrastructure of claim 8, wherein:

the assisting element is operable to perform adaptive merger support processing to tune influence weighting to the user device.

15. An artificial intelligence infrastructure supporting a user device comprising a processing circuitry, the artificial intelligence infrastructure comprising:

a remote artificial intelligence element configured to respond by generating a specific type of output having a first characteristic associated with a predicted likelihood of user satisfaction with the output;

a local artificial intelligence element configured to respond by generating the specific type of output having a second characteristic associated with a predicted likelihood of user satisfaction with the output; and an assisting element configured to choose between the local artificial intelligence element and the remote artificial intelligence element for the generation of the specific type of output based at least in part on the first characteristic and the second characteristic, such that the choice is based at least in part on the predicted likelihood of user satisfaction with the output generated by the respective artificial intelligence elements.

16. The artificial intelligence infrastructure of claim 15, wherein:

the assisting element is operable to disregard a specific influence according to the at least one of the first characteristic and the second characteristic.

17. The artificial intelligence infrastructure of claim 15, wherein:

the assisting element is operable to determine a user class, for the first user and the second user, according to one or more of age, gender, location, profession and historical ratings.

18. The artificial intelligence infrastructure of claim 15, wherein:

the assisting element is operable to:

process influence inputs from one or more of personal data, remote sources and current events, and adjust an impact of the influence inputs according to a preference of the first user or the second user.

19. The artificial intelligence infrastructure of claim 15, wherein:

the assisting element is operable to using influence balancing with the local artificial intelligence element and the remote artificial intelligence element to block, accept, reduce or heighten influence contributions from multiple sources.

20. The artificial intelligence infrastructure of claim 15, wherein:

the assisting element is operable to:

balance influence by blocking or adding sources, adjust weights for different user classes, and perform adaptive merger support processing to tune influence weighting.

* * * * *